United States Patent
Akami et al.

(10) Patent No.: US 7,219,781 B2
(45) Date of Patent: May 22, 2007

(54) ELECTROMAGNETIC SUSPENSION SYSTEM

(75) Inventors: Yusuke Akami, Kanagawa-ken (JP); Noriyuki Utsumi, Kanagawa-ken (JP); Hiroshi Yoshikura, Kanagawa-ken (JP); Hiroshi Chikuma, Chiba-ken (JP); Satoshi Ohsawa, Tokyo (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/784,960

(22) Filed: Feb. 25, 2004

(65) Prior Publication Data

US 2005/0016802 A1 Jan. 27, 2005

(30) Foreign Application Priority Data

Feb. 28, 2003 (JP) .............................. 2003-054358
Jan. 30, 2004 (JP) .............................. 2004-024670

(51) Int. Cl.
*F16F 9/00* (2006.01)
(52) U.S. Cl. ................................. 188/322.19; 188/267
(58) Field of Classification Search ................ 188/267, 188/267.1, 267.2, 322.12, 321.11, 322.19
See application file for complete search history.

(56) References Cited

U.S. PATENT DOCUMENTS

| | | | | |
|---|---|---|---|---|
| 4,230,023 A | * | 10/1980 | Ward | ............................ 92/5 L |
| 4,617,855 A | * | 10/1986 | Wrobleski et al. | ............. 92/5 R |
| 4,621,565 A | * | 11/1986 | Leigh-Monstevens | ........ 92/5 R |
| 4,819,546 A | * | 4/1989 | Ernst et al. | .................... 92/5 R |
| 4,838,146 A | * | 6/1989 | Stoll | ............................ 92/5 R |
| 4,839,591 A | * | 6/1989 | Nomura et al. | ......... 324/207.13 |
| 4,952,916 A | * | 8/1990 | Taplin | .......................... 91/361 |
| 5,183,287 A | * | 2/1993 | VanSweden | .......... 280/124.129 |
| 5,256,840 A | * | 10/1993 | Pirhadi | ...................... 200/82 R |
| 5,338,055 A | * | 8/1994 | Mauz | ................... 280/124.147 |
| 5,529,155 A | * | 6/1996 | Jones et al. | ............. 188/322.21 |
| 6,089,111 A | * | 7/2000 | Machijima | .................. 73/866.5 |
| 6,138,458 A | * | 10/2000 | Griffin | .......................... 60/716 |
| 6,382,369 B1 | * | 5/2002 | Lisenker | ................... 188/267.2 |
| 6,866,127 B2 | * | 3/2005 | Nehl et al. | ................ 188/266.1 |

FOREIGN PATENT DOCUMENTS

JP 2002-257189 9/2002

\* cited by examiner

*Primary Examiner*—Robert A. Siconolfi
(74) *Attorney, Agent, or Firm*—Wenderoth, Lind & Ponack, L.L.P.

(57) ABSTRACT

An electromagnetic suspension system comprises a universal joint mechanism for permitting radial movement of a cylinder relative to a center yoke while preventing axial movement of the cylinder relative to the center yoke. Since the cylinder is capable of radial movement relative to the center yoke, if a lateral force acts on the cylinder, the lateral force acting on a hydraulic damper does not have any significant effect on the center yoke 17 with respect to radial movement or rocking movement thereof. Therefore, excessive sliding friction does not occur in a center-yoke dry metal and a piston-rod dry metal, thereby ensuring smooth axial relative displacement between the center yoke and an outer yoke.

19 Claims, 17 Drawing Sheets

ELECTROMAGNETIC SUSPENSION SYSTEM

BACKGROUND OF THE INVENTION

The present invention relates to a damper using an actuator for suppressing vibration by means of an electromagnetic force. Specifically, the present invention relates to an electromagnetic suspension system suitably used for an automobile, a railway vehicle, etc.

As a conventional electromagnetic suspension system, there can be mentioned an electromagnetic suspension system disclosed in Japanese Patent Application Public Disclosure No. 2002-257189. This electromagnetic suspension system is provided between a vehicle body and an axle, and comprises an extensible member (a shock absorber) formed by a cylinder and a rod capable of displacement relative to the cylinder. A cylindrical member having a magnet (a magnetic member) attached thereto is fixed to the cylinder. A cylindrical member having a coil (a coil member) attached thereto is fixed to the rod.

In the above-mentioned electromagnetic suspension system, the following problems (1) to (3) arise, in the case of a lateral force acting on the extensible member (the shock absorber).

(1) One of the cylindrical members strongly presses the other, so that sliding resistance is generated between the magnet and the coil, respectively provided in the cylindrical members, thus preventing smooth operation of the extensible member.

(2) If a space between the magnet and the coil is radially increased to avoid the above problem (1), a gap between the magnet and the coil increases, so that a lowering of an electromagnetic force and an increase in power consumption occur.

(3) If the extensible member is imparted with an increased stiffness to solve the above problem (1), an undesirable increase in the size and the weight of the extensible member is necessary.

SUMMARY OF THE INVENTION

In view of the above situation, the present invention has been made. It is an object of the present invention to provide an electromagnetic suspension system which is capable of effecting axial relative displacement, regardless of a lateral force acting on an extensible member.

The present invention provides an electromagnetic suspension system comprising: an extensible member including a cylinder and a rod capable of displacement relative to the cylinder; a first cylindrical member connected to the rod, either one of a coil member and a magnetic member being provided in the first cylindrical member; and a second cylindrical member provided in such a manner as to permit radial movement thereof relative to the cylinder while preventing axial movement thereof relative to the cylinder, the other of the coil member and the magnetic member being provided in the second cylindrical member, the second cylindrical member facing either one of an inner side and an outer side of the first cylindrical member. In this electromagnetic suspension system, if a lateral force acts on the extensible member, the lateral force does not have any significant effect on the second cylindrical member with respect to radial or rocking movement thereof. Therefore, excessive sliding friction does not occur in slide/support members for the first and second cylindrical members, thus ensuring smooth axial relative displacement between the first and second cylindrical members.

The present invention also provides an electromagnetic suspension system comprising: an extensible member including a cylinder and a rod capable of displacement relative to the cylinder; a second cylindrical member connected to the cylinder, either one of a coil member and a magnetic member being provided in the second cylindrical member; and a first cylindrical member provided in such a manner as to permit radial movement thereof relative to the rod while preventing axial movement thereof relative to the rod, the other of the coil member and the magnetic member being provided in the first cylindrical member, the first cylindrical member facing either one of an inner side and an outer side of the second cylindrical member. In this electromagnetic suspension system, if a lateral force acts on the extensible member, the lateral force does not have any significant effect on the first cylindrical member with respect to radial (rocking) movement thereof. Therefore, excessive sliding friction does not occur in slide/support members for the first and second cylindrical members, thus ensuring smooth axial relative displacement between the first and second cylindrical members.

The present invention further provides an electromagnetic suspension system comprising: an extensible member including a cylinder and a rod capable of displacement relative to the cylinder; a second cylindrical member provided in such a manner as to permit radial movement thereof relative to the cylinder while preventing axial movement thereof relative to the cylinder, either one of a coil member and a magnetic member being provided in the second cylindrical member; and a first cylindrical member provided in such a manner as to permit radial movement thereof relative to the rod while preventing axial movement thereof relative to the rod, the other of the coil member and the magnetic member being provided in the first cylindrical member, the first cylindrical member facing either one of an inner side and an outer side of the second cylindrical member. In this electromagnetic suspension system, the second cylindrical member is capable of radial movement relative to the cylinder and the first cylindrical member is capable of radial movement relative to the rod. Therefore, it is possible to minimize an effect of a lateral force acting on the extensible member with respect to the first and second cylindrical members.

The present invention further provides an electromagnetic suspension system comprising: an extensible member including a cylinder and a rod capable of displacement relative to the cylinder; a rod guide provided in the extensible member and adapted to guide displacement of the rod; a spherical bearing provided on an outer circumferential surface of the rod guide; a second cylindrical member guided by the spherical bearing so that it is capable of performing rocking movement, either one of a coil member and a magnetic member being provided in the second cylindrical member; and a first cylindrical member which is integral with the rod or which is provided in such a manner as to permit radial movement thereof relative to the rod while preventing axial movement thereof relative to the rod, the other of the coil member and the magnetic member being provided in the first cylindrical member, the first cylindrical member facing the second cylindrical member. In this electromagnetic suspension system, the spherical bearing, which is provided on the outer circumferential surface of the rod guide provided in the extensible member, guides the second cylindrical member so that it is capable of performing rocking movement. Therefore, the second cylindrical member rocks on the spherical bearing as on a fulcrum.

In the above-mentioned electromagnetic suspension system, a bearing member for guiding sliding movement of the first cylindrical member and the second cylindrical member may be provided between the first cylindrical member and the second cylindrical member.

In the above-mentioned electromagnetic suspension system, a universal joint mechanism for permitting the radial movement while preventing the axial movement may be provided between the cylinder and the second cylindrical member.

In the above-mentioned electromagnetic suspension system, a universal joint mechanism for permitting the radial movement while preventing the axial movement may be provided between the rod and the first cylindrical member.

In the above-mentioned electromagnetic suspension system, universal joint mechanisms for permitting the radial movement while preventing the axial movement may be respectively provided between the cylinder and the second cylindrical member and between the rod and the first cylindrical member.

DETAILED DESCRIPTION OF THE PREFERRED EMBODIMENTS

Figure 1:
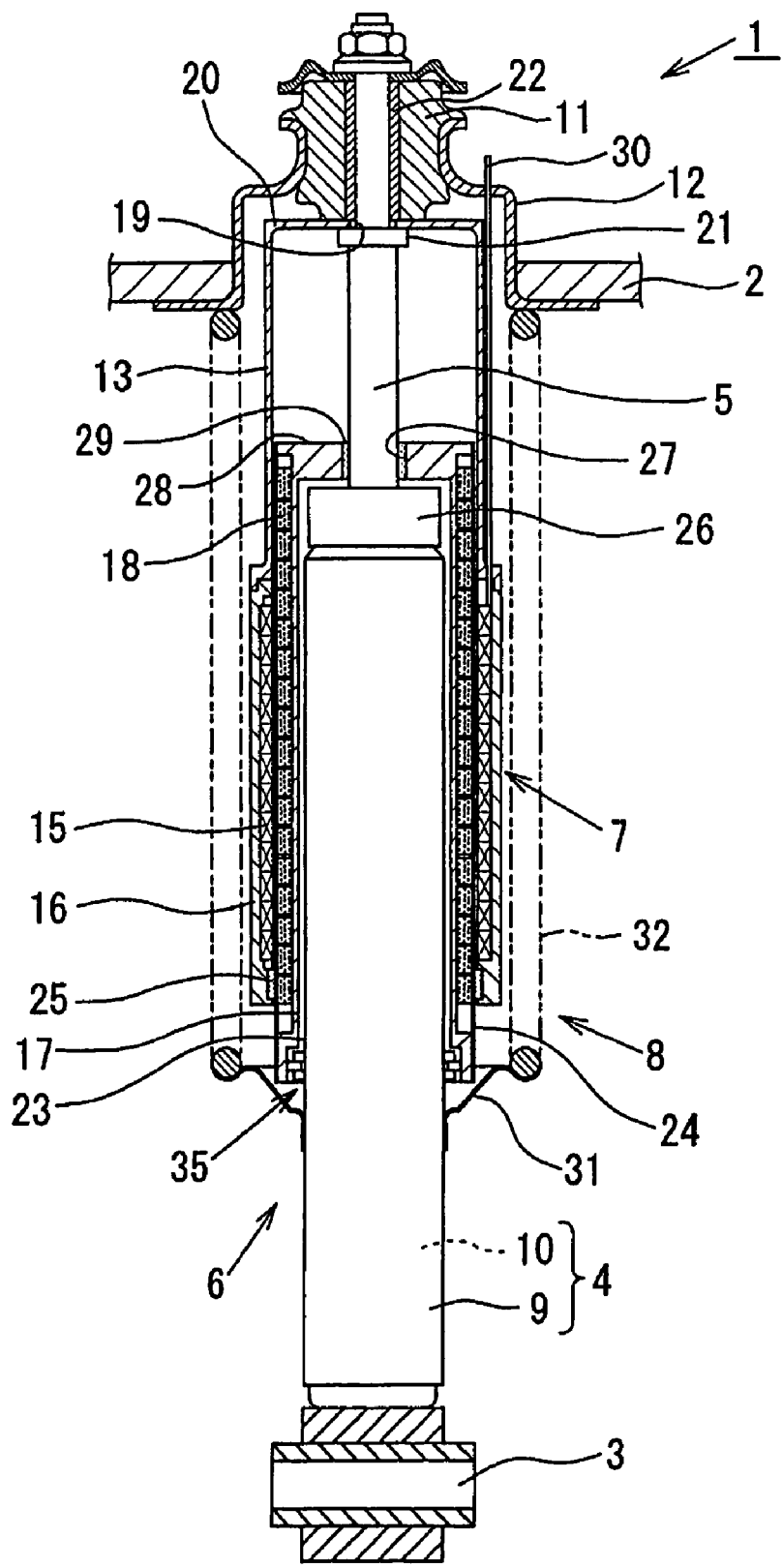
FIG. 1 is a sectional view of an electromagnetic suspension system according to a first embodiment of the present invention.
Figure 2:
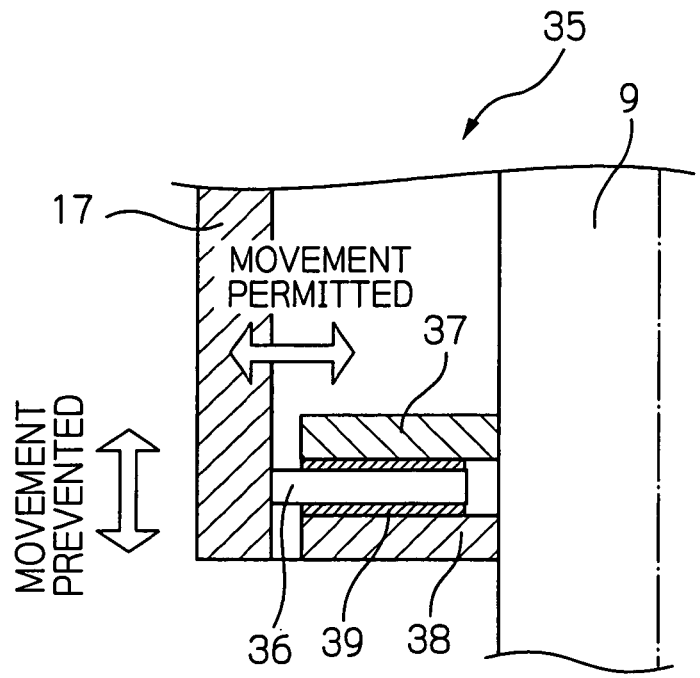
FIG. 2 is a sectional view of a universal joint mechanism shown in FIG. 1.

Referring to FIGS. 1 and 2, description is made with regard to an electromagnetic suspension system according to a first embodiment of the present invention. In FIG. 1, an electromagnetic suspension system 1 is provided between a vehicle body 2 and an axle 3 of a vehicle. The electromagnetic suspension system 1 comprises a hydraulic damper 6 (or a shock absorber) as an extensible member, an electromagnetic linear motor 7 and a spring mechanism 8.

The hydraulic damper 6 comprises a cylinder 4 and a piston rod 5 capable of displacement relative to the cylinder 4.

The cylinder 4 has a dual-tube structure comprising an outer tube 9 and an inner tube 10.

One end of the piston rod 5 is attached to a piston (not shown). The piston is slidably disposed within the inner tube 10, thus dividing the inside of the inner tube 10 into two liquid chambers. The other end of the piston rod 5 is connected through a rubber bush (hereinafter referred to as "the vehicle-body rubber bush") 11 to an upper mount 12 held on the vehicle body 2 (a sprung mass). Force transmitted through the piston rod 5 is further transmitted through the vehicle-body rubber bush 11 to the vehicle body 2. Therefore, fine vibration of the hydraulic damper 6, and movement of the hydraulic damper 6 when it slightly rocks or tilts during a stroke, are absorbed by the vehicle-body rubber bush 11.

An end portion of the outer tube 9 (the cylinder 4) on a side opposite to the piston rod 5 is connected to the axle 3 (an unsprung mass). The hydraulic damper 6 includes a damping force generating mechanism (not shown), and is adapted to generate a damping force according to relative displacement between the piston and the inner tube 10 (or the cylinder 4) caused by relative displacement between the vehicle body 2 and the axle 3.

The electromagnetic linear motor 7 comprises a cylindrical outer yoke 16 (a first cylindrical member) and a cylindrical center yoke 17 (a second cylindrical member) provided inside the outer yoke 16 and capable of axial displacement relative to the outer yoke 16.

The outer yoke 16 is supported by a pipe (hereinafter referred to as "the outer-yoke pipe") 13 fixed to the piston rod 5. A coil 15 (a coil member) is attached to an inner circumferential surface of the outer yoke 16.

One end (a lower end portion as viewed in FIG. 1) of the center yoke 17 is connected to an outer circumferential surface of the outer tube 9 (the cylinder 4) through a universal joint mechanism 35. A permanent magnet 18 (a magnetic member) is provided on an outer circumferential surface of the center yoke 17, which cooperates with the coil 15 to generate an electromagnetic force.

The outer-yoke pipe 13 includes a cover portion (hereinafter referred to as "the outer-yoke pipe cover portion") 20 formed at an upper end portion thereof. The outer-yoke pipe cover portion 20 includes an opening 19 formed therein for allowing passage of the piston rod 5. The outer-yoke pipe cover portion 20 is held between the vehicle-body rubber bush 11 and a collar 22 disposed within the vehicle-body rubber bush 11, and a shoulder portion 21 formed in the piston rod 5. Thus, the outer-yoke pipe 13 is supported on the piston rod 5. The outer yoke 16 is supported by a lower end portion of the outer-yoke pipe 13 by fitting engagement. An axially extended cylindrical space (hereinafter referred to as "the cylindrical space") 23 is formed between the outer tube 9 (the cylinder 4) and the center yoke 17.

A guide pipe 24 is attached to the center yoke 17 so as to cover the permanent magnet 18. A dry metal (hereinafter referred to as "the center-yoke dry metal") 25 is provided on an inner circumferential surface of one end (on a side of the unsprung mass; a lower side in FIG. 1) of the outer yoke 16. The center-yoke dry metal 25 is adapted to guide axial sliding movement of the guide pipe 24 (or the center yoke 17) without lubrication. The other end of the center yoke 17 extends beyond a cap 26 connected to the outer tube 9 and ends at a position facing the piston rod 5. It includes a cover portion (hereinafter referred to as "the center-yoke cover portion") 28 formed therein. The center-yoke cover portion 28 includes an opening 27 for allowing passage of the piston rod 5. A dry metal (hereinafter referred to as "the piston-rod dry metal") 29 is provided in the opening 27 of the center-yoke cover portion 28. The piston-rod dry metal 29 is adapted to guide axial sliding movement of the piston rod 5 without lubrication.

A cable 30 covered with a protective member (not indicated by a reference numeral) is connected to the coil 15. Power is supplied from a motor driver (not shown) through the cable 30 to the coil 15. The electromagnetic linear motor 7 provides a propelling force due to the action of an electromagnetic force, which is generated between the coil 15 and the permanent magnet 18 by energizing the coil 15, and provides a damping force due to the action of an electromotive force, which is generated in the coil 15 according to relative displacement between the coil 15 and the permanent magnet 18. The piston rod 5 is connected through the vehicle-body rubber bush 11 (an elastic body) to the upper mount 12 held on the vehicle body 2 (the sprung mass).

The spring mechanism 8 comprises the upper mount 12, a spring bearing 31 fixed to the outer circumferential surface of the outer tube 9 (the cylinder 4) and a coil spring 32 provided between the upper mount 12 and the spring bearing 31.

In this embodiment, the electromagnetic linear motor 7 generally comprises the outer yoke 16, the coil 15, the center yoke 17 including the guide pipe 24, and the permanent magnet 18. When a current is applied from the motor driver (not shown) through the cable 30 to the coil 15, a propelling force that causes relative displacement between the coil 15 (or the outer yoke 16) and the permanent magnet 18 (or the center yoke 17) is generated.

When axial relative displacement occurs between the coil 15 (or the outer yoke 16) and the permanent magnet 18 (or the center yoke 17), a damping force for the relative displacement is generated between the coil 15 (or the outer yoke 16) and the permanent magnet 18 (or the center yoke 17), due to an electromagnetic effect of the coil 15 and the permanent magnet 18.

As shown in FIG. 1, a universal joint mechanism 35 is provided between the outer tube 9 (or the cylinder 4) and the center yoke 17 (the second cylindrical member). The universal joint mechanism 35 is adapted to prevent axial movement of the hydraulic damper 6 (especially, the cylinder 4 or the outer tube 9) relative to the center yoke 17 while permitting radial movement of the hydraulic damper 6 (especially, the cylinder 4 or the outer tube 9) relative to the center yoke 17.

As indicated in FIG. 2, the universal joint mechanism 35 generally comprises a plurality of (for example, four) pins 36, a pair of guide plates 37, 38 and cylindrical guide bushes 39 made of a resin material. The pins 36 are provided on an inner circumferential surface of the center yoke 17 such that they are circumferentially arranged in a predetermined spaced relationship to each other. The pins 36 extend perpendicularly relative to the inner circumferential wall surface of the center yoke 17 in a radially inward direction. The pair of guide plates 37, 38 specifically comprises an annular first guide plate 37 and an annular second guide plate 38, and extend in a circumferential direction of the outer tube 9. The first guide plate 37 and the second guide plate 38 are arranged in a longitudinal direction of the outer tube 9 (in a vertical direction as viewed in FIG. 2) so that the pins 36 are disposed between the first guide plate 37 and the second guide plate 38. An inner circumferential surface of the first guide plate 37 and an inner circumferential surface of the second guide plate 38 are fixed to the outer circumferential surface of the outer tube 9. The cylindrical guide bush 39, which is made of a resin material, is fitted over the pin 36. The guide bush 39 fitted over the pin 36 is slidably inserted between the first guide plate 37 and the second guide plate 38.

In the first embodiment, the universal joint mechanism 35 is provided between the outer tube 9 (or the cylinder 4) and the center yoke 17 (the second cylindrical member), so as to permit radial relative movement between the outer tube 9 and the center yoke 17. With this arrangement, in the case of a lateral force acting on the hydraulic damper 6 (or the outer tube 9), the guide plates 37, 38 radially move along the pin 36 while slidably moving on the guide bush 39 fitted over the pin 36. That is, the hydraulic damper 6 (especially, the cylinder 4 or the outer tube 9) radially moves or rocks relative to the center yoke 17. Therefore, the lateral force acting on the hydraulic damper 6 has substantially no effect on the center yoke 17 (or the permanent magnet 18). That is, if the hydraulic damper 6 radially moves or rocks, the center yoke 17 (or the permanent magnet 18) can be reciprocally moved in an axial direction, without being caused to perform substantial radial or rocking movement. Therefore, a gap between the center yoke 17 (or the permanent magnet 18) and the outer yoke 16 (or the coil 15) can be substantially maintained at a predetermined value, and a gap between the center-yoke cover portion 28 of the center yoke 17 and the piston rod 5 can be substantially maintained at a predetermined value. Consequently, it is possible to maintain low sliding resistance between the center-yoke dry metal 25 as a slide/support member and the guide pipe 24. It is also possible to maintain low sliding resistance between the piston-rod dry metal 29 as a slide/support member and the piston rod 5. This prevents excessive wear of the center-yoke dry metal 25 and the piston-rod dry metal 29. Therefore, it is possible to ensure smooth relative axial displacement between the center yoke 17 (or the permanent magnet 18) and the outer yoke 16 (or the coil 15) and between the piston rod 5 and the center yoke 17.

On the other hand, when a vertical force acts on the hydraulic damper 6 (or the outer tube 9), axial movement of the guide plates 37, 38 is restricted by the pins 36, so that there is no relative axial movement between the cylinder 4 (or the outer tube 9) and the center yoke 17 (or the permanent magnet 18), and the center yoke 17 (or the permanent magnet 18) and the cylinder 4 (or the outer tube 9) move as a unit.

As described above, smooth relative displacement between the center yoke 17 and the outer yoke 16 can be ensured without increasing the gap between the permanent magnet 18 and the coil 15. Therefore, there are no problems such as a lowering of an electromagnetic force or an increase in power consumption. Further, smooth relative displacement between the center yoke 17 and the outer yoke 16 can be ensured, regardless of the size of the gap. Therefore, the gap can be reduced to thereby achieve an increase in an electromagnetic force and a reduction of power consumption.

Further, smooth relative displacement between the center yoke 17 and the outer yoke 16 can be ensured, regardless of the stiffness of the hydraulic damper 6. Therefore, there is no need to impart the hydraulic damper 6 with an increased stiffness so as to ensure smooth relative displacement between the center yoke 17 and the outer yoke 16.

Further, in the first embodiment, a cylindrical space 23 is formed between the outer tube 9 and the inner circumferential wall surface of the center yoke 17 on which the permanent magnet 18 is provided. With this arrangement, when the hydraulic damper 6 is operated, a flow of air is generated in the cylindrical space 23, thereby increasing cooling efficiency. Further, it is possible to prevent heat generated in the hydraulic damper 6 from being transmitted to the permanent magnet 18 of the electromagnetic linear motor 7.

Further, since the cylindrical space 23 is formed between the outer tube 9 and the inner circumferential wall surface of the center yoke 17 on which the permanent magnet 18 is provided, the hydraulic damper 6 and the electromagnetic linear motor 7 are substantially insulated from each other in terms of heat. Therefore, a temperature of the electromagnetic linear motor 7 can be controlled, based on a current applied to the electromagnetic linear motor 7, thus achieving high reliability of the electromagnetic linear motor 7. Further, the life of the electromagnetic linear motor 7 can be increased.

Figure 3:
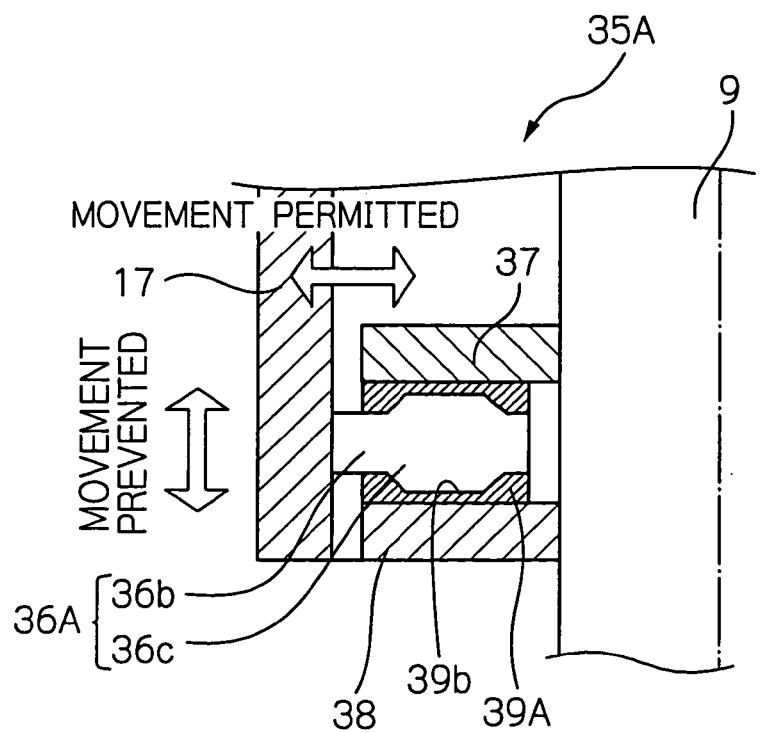
FIG. 3 is a sectional view of a universal joint mechanism, which is used instead of that shown in FIG. 2.

Instead of the universal joint mechanism 35 shown in FIGS. 1 and 2, a universal joint mechanism 35A shown in FIG. 3, may be used. The universal joint mechanism 35A shown in FIG. 3 differs from the universal joint mechanism 35 of FIGS. 1 and 2 in that pins 36A and rubber bushes 39A are used instead of the pins 36 and the guide bushes 39.

The pin 36A comprises a cylindrical pin body 36b and a diametrically enlarged portion 36c formed at a central portion of the pin body 36b. The rubber bush 39A is substantially in a rectangular pillarlike form and is fitted over the pin 36A. The rubber bush 39A includes a hollow portion formed therein with which the pin 36A is fittingly engaged. The hollow portion of the rubber bush 39A includes openings respectively formed on opposite ends thereof, each having a diameter substantially equal to that of the pin body 36b, and also includes a recessed cylindrical portion 39b formed at a central portion thereof, which has a diameter substantially equal to that of the diametrically enlarged portion 36c. The diametrically enlarged portion 36c is fittingly disposed in the recessed cylindrical portion 39b. An upper side and a lower side of the rubber bush 39A are, respectively, fixed to the first guide plate 37 and the second guide plate 38 by adhesion.

In the universal joint mechanism 35A, the rubber bush 39A between the pin body 36b and the first and second guide plates 37, 38 has a large wall-thickness and is capable of radial deformation, thereby permitting radial movement of the hydraulic damper 6 relative to the center yoke 17 or radial movement of the center yoke 17 relative to the hydraulic damper 6. Therefore, smooth axial relative displacement of the center yoke 17 (or the permanent magnet 18) relative to the outer yoke 16 (or the coil 15) can be ensured. Since the diametrically enlarged portion 36c is fittingly disposed in the recessed cylindrical portion 39b, the rubber bush 39A between the diametrically enlarged portion 36c and the first and second guide plates 37, 38 becomes thin-walled, and is not substantially deformed in an axial direction, thus preventing axial movement of the center yoke 17 relative to the hydraulic damper 6. Consequently, it is possible to maintain low sliding resistance between the center-yoke dry metal 25, as a slide/support member, and the guide pipe 24. It is also possible to maintain low sliding resistance between the piston-rod dry metal 29, as a slide/support member, and the piston rod 5. This prevents excessive wear of the slide/support members (the center-yoke dry metal 25 and the piston-rod dry metal 29).

Figure 4:
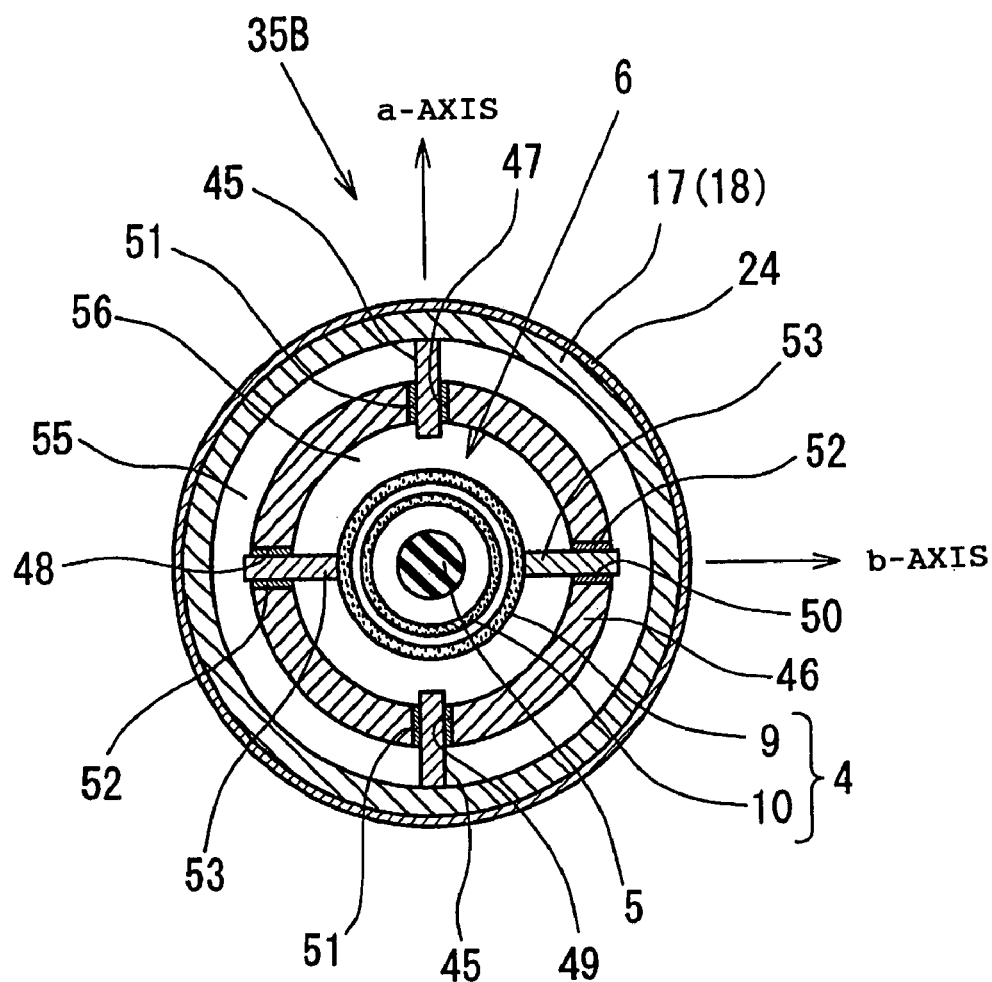
FIG. 4 is a sectional view of a universal joint mechanism, which is used instead of those of FIGS. 2 and 3.

Instead of the universal joint mechanism 35 shown in FIGS. 1 and 2, a universal joint mechanism 35B shown in FIG. 4 may be used. As indicated in FIG. 4, the universal joint mechanism 35B comprises two pins (hereinafter referred to as "the center-yoke pins") 45 provided on the inner circumferential surface of the center yoke 17 and a ring 46 provided between the center yoke 17 and the outer tube 9. The two center-yoke pins 45 extend from an inner wall surface of the center yoke 17 in a radially inward direction and are disposed so as to face each other. As shown in FIG. 4, the ring 46 includes four openings formed at 90-degree intervals (for the sake of convenience, these four openings are referred to as "the first opening 47", "the second opening 48", "the third opening 49" and "the fourth opening 50" in the order of arrangement in a circumferential direction). Dry metals are attached to the first to fourth openings 47 to 50.

The two center-yoke pins 45 are respectively inserted into dry metals (referred to as "the universal-joint first dry metals", for the sake of convenience) 51 of the first and third openings 47, 49. The ring 46 is rotatably supported by the center-yoke pins 45 through the universal-joint first dry metals 51 of the first and third openings 47, 49 so that the ring 46 is capable of rotating about the center-yoke pins 45. The dry metals of the second and fourth openings 48, 50 are hereinafter referred to as "the universal-joint second dry metals 52" for the sake of convenience.

For the purpose of explanation, the center axis of the center-yoke pins 45 is called "the a-axis" and the axis perpendicular to the a-axis is called "the b-axis". Two pins (hereinafter referred to as "the outer-tube pins") 53 are attached to the outer tube 9. The outer-tube pins 53 extend from an outer wall surface of the outer tube 9 in a radially outward direction and are disposed so as to face each other. The two outer-tube pins 53 are respectively inserted into the universal-joint second dry metals 52 of the second and fourth openings 48, 50. The outer-tube pins 53 are rotatably supported by the universal-joint second dry metals 52 of the second and fourth openings 48, 50. Thus, the outer-tube pins 53 are supported by the ring 46 so that it is capable of rotating about the b-axis.

As is described above, the ring 46 is supported by the center-yoke pins 45 through the universal-joint first dry metals 51 of the first and third openings 47, 49 so that the ring 46 is capable of rotating about the a-axis.

A predetermined space 55 is formed between the center yoke 17 and the ring 46. A predetermined space 56 is formed between the outer tube 9 and the ring 46.

Therefore, when a lateral force acting in a direction of the a-axis is applied to the hydraulic damper 6 (or the outer tube 9), the cylinder 4, together with the outer-tube pins 53 and the ring 46, moves in a direction of the axis of the center-yoke pins 45 (in the direction of the a-axis) relative to the center yoke 17. Otherwise, the cylinder 4, together with the outer-tube pins 53, rotates or rocks about the b-axis.

When a lateral force acting in a direction of the b-axis is applied to the hydraulic damper 6 (or the outer tube 9), the cylinder 4 and the outer-tube pins 53 move in a direction of the axis of the outer-tube pins 53 (in the direction of the b-axis) relative to the ring 46 and the center yoke 17. Otherwise, the cylinder 4, together with the ring 46 and the outer-tube pins 53, rotates or rocks about the a-axis.

With this arrangement, if the hydraulic damper 6 radially moves or rocks, the center yoke 17 (or the permanent magnet 18) can be reciprocally moved in an axial direction, without being caused to perform substantial radial or rocking movement. Therefore, the gap between the center yoke 17 (or the permanent magnet 18) and the outer yoke 16 (or the coil 15) can be substantially maintained at a predetermined value and the gap between the center-yoke cover portion 28 of the center yoke 17 and the piston rod 5 can be substantially maintained at a predetermined value.

The cylinder 4 is disposed in an axially fixed relationship to the center yoke 17 through the outer-tube pins 53, the ring 46 and the center-yoke pins 45. Thus, the universal joint mechanism 35B of FIG. 4 prevents axial movement of the cylinder 4 (or the outer tube 9) relative to the center yoke 17, while permitting radial movement of the cylinder 4 (or the outer tube 9) relative to the center yoke 17.

That is, the outer tube 9 of the hydraulic damper 6, together with the outer-tube pins 53 and the ring 46, is capable of moving along the a-axis and rotating about the a-axis, relative to the center yoke 17. Further, the outer tube 9, together with the outer-tube pins 53, is capable of moving along the b-axis and rotating about the b-axis, relative to the ring 46. Thus, the universal joint mechanism 35B is capable of permitting only a movement of the center yoke 17 in a radial direction (a direction perpendicular to the axis of the hydraulic damper 6 and the electromagnetic linear motor 7) relative to the hydraulic damper 6, and preventing a movement of the center yoke 17 in an axial direction relative to the hydraulic damper 6.

Figure 5:
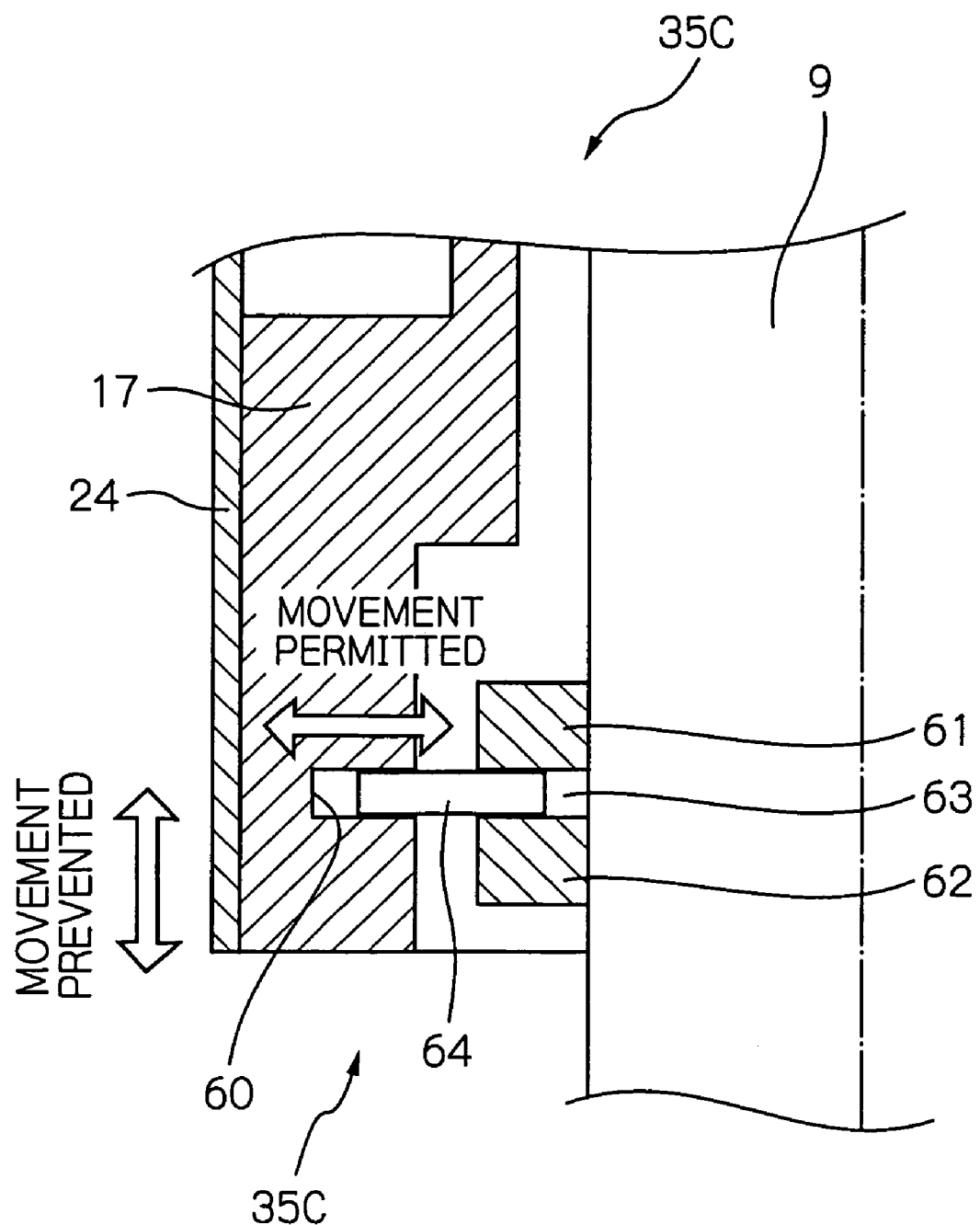
FIG. 5 is a sectional view of a universal joint mechanism, which is used instead of those of FIGS. 2 to 4.

A universal joint mechanism 35C shown in FIG. 5 may also be used.

As shown in FIG. 5, the universal joint mechanism 35C comprises an annular groove (a center-yoke annular groove 60) formed in the inner circumferential surface of the center yoke 17, annular first and second guide plates 61, 62 vertically arranged and fixed to the outer circumferential surface of the outer tube 9, and a retainer ring (such as a C-shaped retainer ring) 64 inserted into the center-yoke annular groove 60 and an annular groove (an outer-tube annular groove 63) formed between the first and second guide plates 61, 62.

With this arrangement, the universal joint mechanism 35C prevents axial movement of the center yoke 17 relative to the outer tube 9 (the cylinder 4), while permitting radial movement of the center yoke 17 relative to the outer tube 9 (the cylinder 4).

Figure 6:
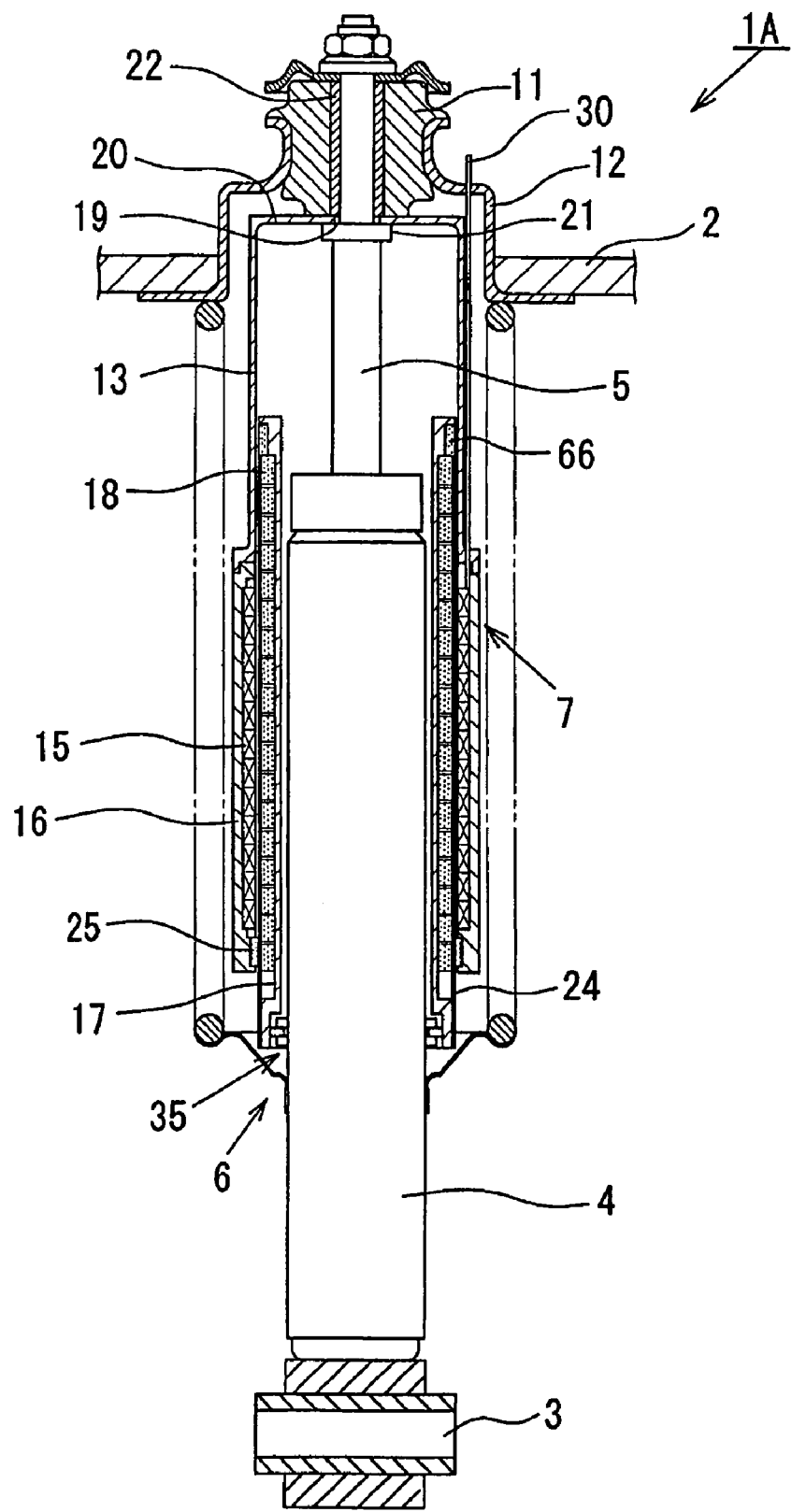
FIG. 6 is a sectional view of an electromagnetic suspension system according to a second embodiment of the present invention.

Next, referring to FIG. 6, description is made with regard to an electromagnetic suspension system 1A according to a second embodiment of the present invention. The electromagnetic suspension system 1A mainly differs from the electromagnetic suspension system 1 of the first embodiment in that: (1) the center-yoke cover portion 28 of the center yoke 17 is eliminated; (2) the piston-rod dry metal 29 provided between the center-yoke cover portion 28 and the piston rod 5 is eliminated; and (3) a dry metal (hereinafter referred to as "the pipe dry metal") 66 is provided between the other end of the center yoke 17 and the outer-yoke pipe 13 (the first cylindrical member) supporting the outer yoke 16. The pipe dry metal 66 is attached to the other end of the center yoke 17. The same members as indicated in FIG. 1 are designated by the same reference numerals as used in FIG. 1, and explanation thereof is omitted.

As in the electromagnetic suspension system 1 of the first embodiment, in the electromagnetic suspension system 1A, the outer yoke 16 is fixed to the piston rod 5 through the outer-yoke pipe 13 (the first cylindrical member), and the outer tube 9 (the cylinder 4) is capable of moving in a radial direction relative to the center yoke 17 (the second cylindrical member) and is prevented from moving in an axial direction relative to the center yoke 17.

Further, since radial movement of the hydraulic damper 6 relative to the center yoke 17 is permitted, as in the electromagnetic suspension system 1, excessive wear of the center-yoke dry metal 25 and the pipe dry metal 66 as slide/support members is prevented. Therefore, smooth axial relative displacement between the center yoke 17 as the second cylindrical member (or the permanent magnet 18) and the outer yoke 16 as the first cylindrical member (or the coil 15) can be ensured.

Figure 7:
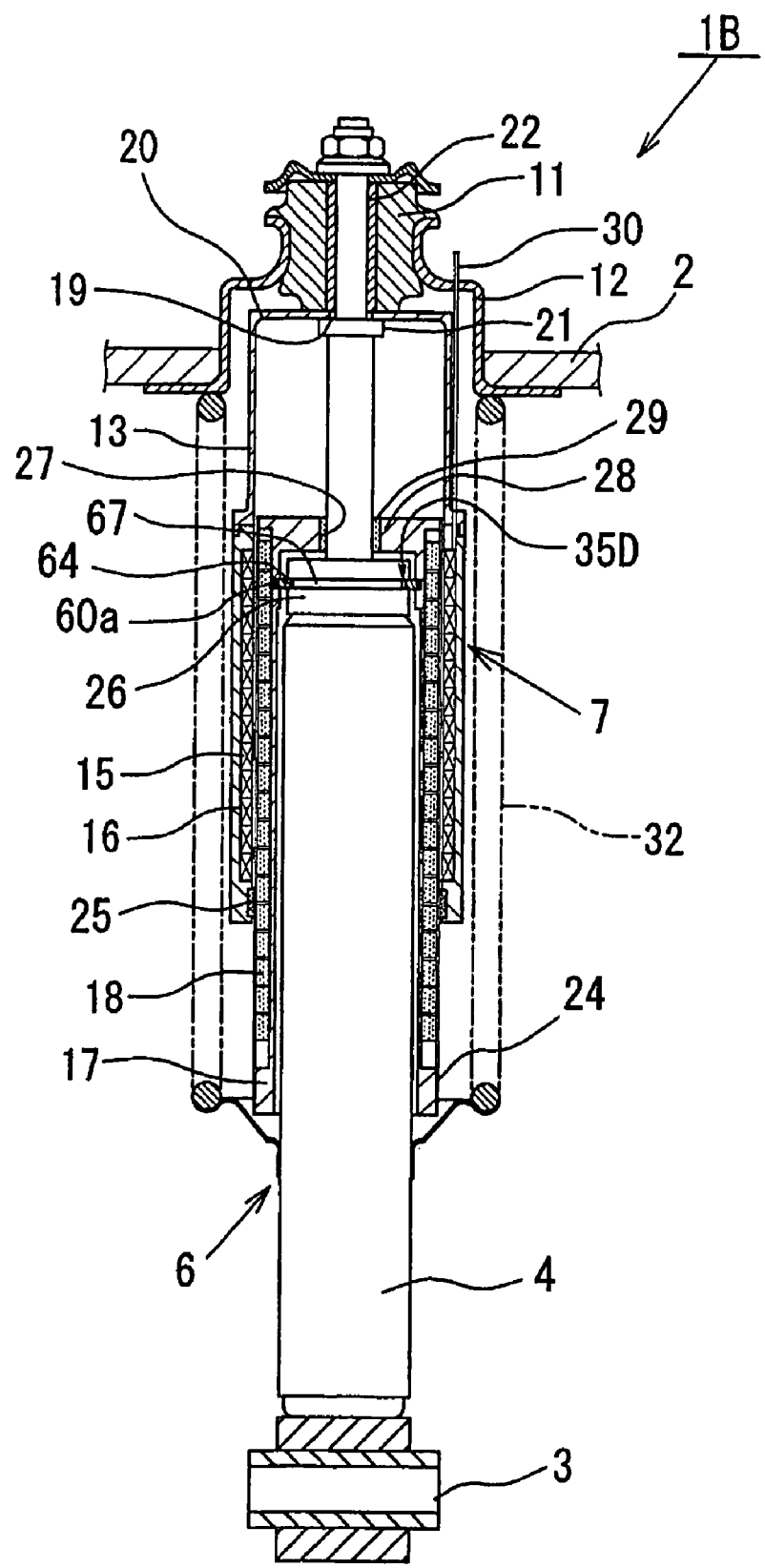
FIG. 7 is a sectional view of an electromagnetic suspension system according to a third embodiment of the present invention.

Next, referring to FIG. 7, description is made with regard to an electromagnetic suspension system 1B according to a third embodiment of the present invention. The electromagnetic suspension system 1B mainly differs from the electromagnetic suspension system 1 of the first embodiment in that: the universal joint mechanism 35 between one end of the center yoke 17 and the outer circumferential surface of the outer tube 9 (the cylinder 4) is eliminated; and a universal joint mechanism 35D is provided between one end of the center yoke 17 and the cap 26 connected to the outer tube 9. The same members as indicated in FIG. 1 are designated by the same reference numerals as used in FIG. 1, and explanation thereof is omitted.

The universal joint mechanism 35D differs from the universal joint mechanism 35C of FIG. 5 in that: the annular first and second guide plates 61, 62 are eliminated; an annular groove (a cap annular groove) 67 is formed in the cap 26; a center-yoke annular groove 60a is formed, instead of the center-yoke annular groove 60, in the inner circumferential surface of the center yoke 17 on a side of the vehicle body 2; and the retainer ring 64 is inserted into the cap annular groove 67 and the center-yoke annular groove 60a.

As in the electromagnetic suspension system 1, in the electromagnetic suspension system 1B, radial movement of the hydraulic damper 6 relative to the center yoke 17 is permitted, so that excessive wear of the center-yoke dry metal 25 and the piston-rod dry metal 29 as slide/support members is prevented. Therefore, smooth axial relative displacement between the center yoke 17 as the second cylindrical member (or the permanent magnet 18) and the outer yoke 16 as the first cylindrical member (or the coil 15) and smooth axial relative displacement between the piston rod 5 and the center yoke 17 can be ensured. Further, the universal joint mechanism 35D is provided such that, when in use, it is at a substantial distance from a road surface, which is advantageous in terms of avoiding dust and water.

Figure 8:
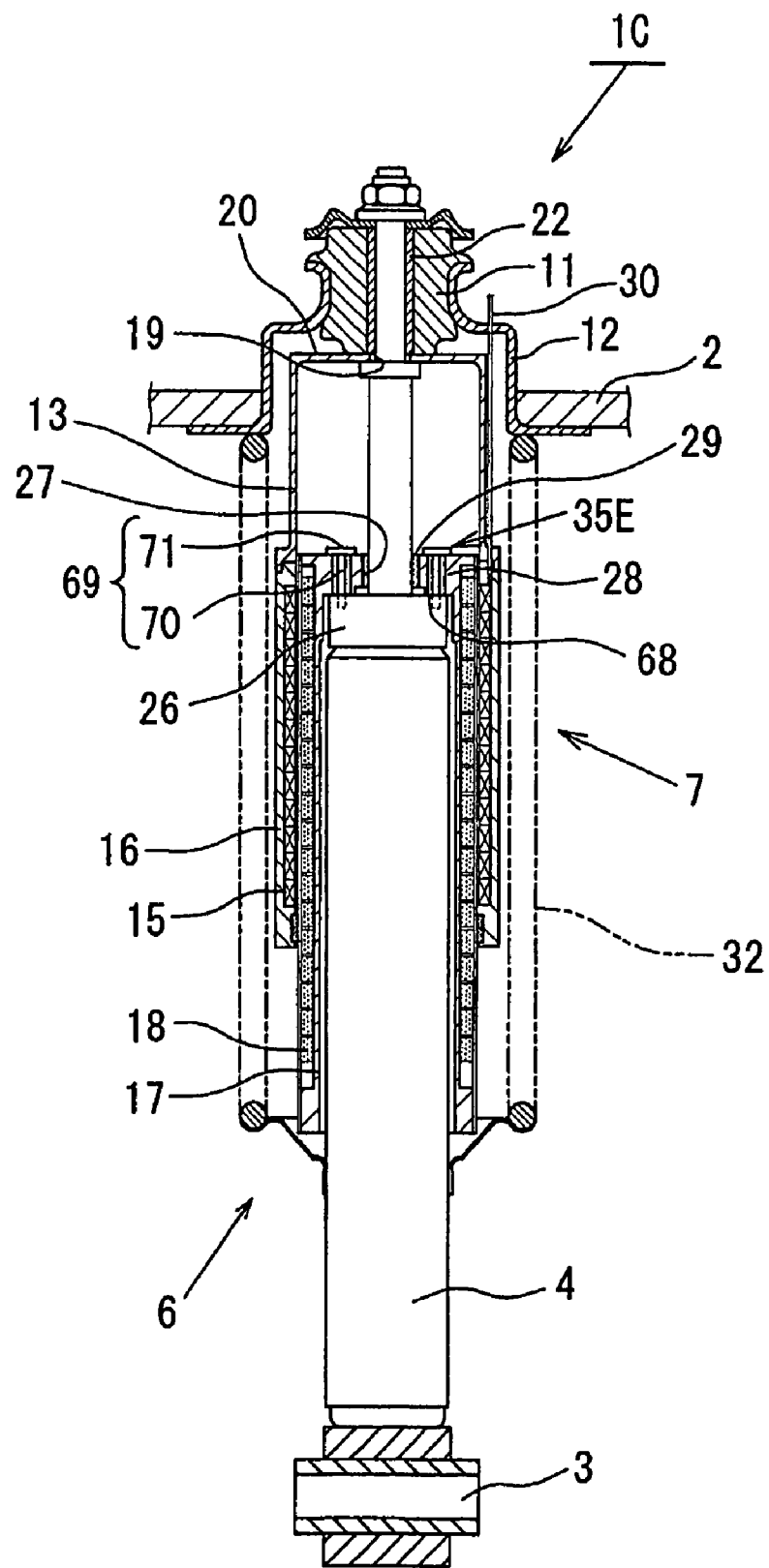
FIG. 8 is a sectional view of an electromagnetic suspension system according to a fourth embodiment of the present invention.

Next, referring to FIG. 8, description is made with regard to an electromagnetic suspension system 1C according to a fourth embodiment of the present invention. The same members as indicated in FIG. 1 are designated by the same reference numerals as used in FIG. 1, and explanation thereof is omitted.

As shown in FIG. 8, the electromagnetic suspension system 1C comprises a universal joint mechanism 35E provided between the center-yoke cover portion 28 of the center yoke 17 and the cap 26. The universal joint mechanism 35E comprises a plurality of openings 68 formed in the center-yoke cover portion 28, which are arranged in a circumferential direction about the opening 27 of the center-yoke cover portion 28, and pins (cap-fixing pins) 69 inserted into the openings 68. The cap-fixing pin 69 comprises a pin body 70 which is extended through the opening 68 and fixed to the cap 26 and a pin head 71 fixed to the pin body 70. The pin head 71 of the cap-fixing pin 69 abuts against an outer surface of the center-yoke cover portion 28, to thereby fix the center yoke 17 to the cap 26. A diameter of the opening 68 is larger than that of the pin body 70. The cylinder 4 (or the hydraulic damper 6) is capable of moving in a radial direction relative to the center yoke 17 while being guided by the pin bodies 70.

Thus, the electromagnetic suspension system 1C comprises the universal joint mechanism 35E provided between the cap 26 (the cylinder 4) and the center-yoke cover portion 28 of the center yoke 17 (the second cylindrical member). By means of the universal joint mechanism 35E, radial movement of the hydraulic damper 6, especially the cylinder 4, relative to the center yoke 17 is permitted, while axial movement of the hydraulic damper 6 relative to the center yoke 17 is prevented.

Figure 9:
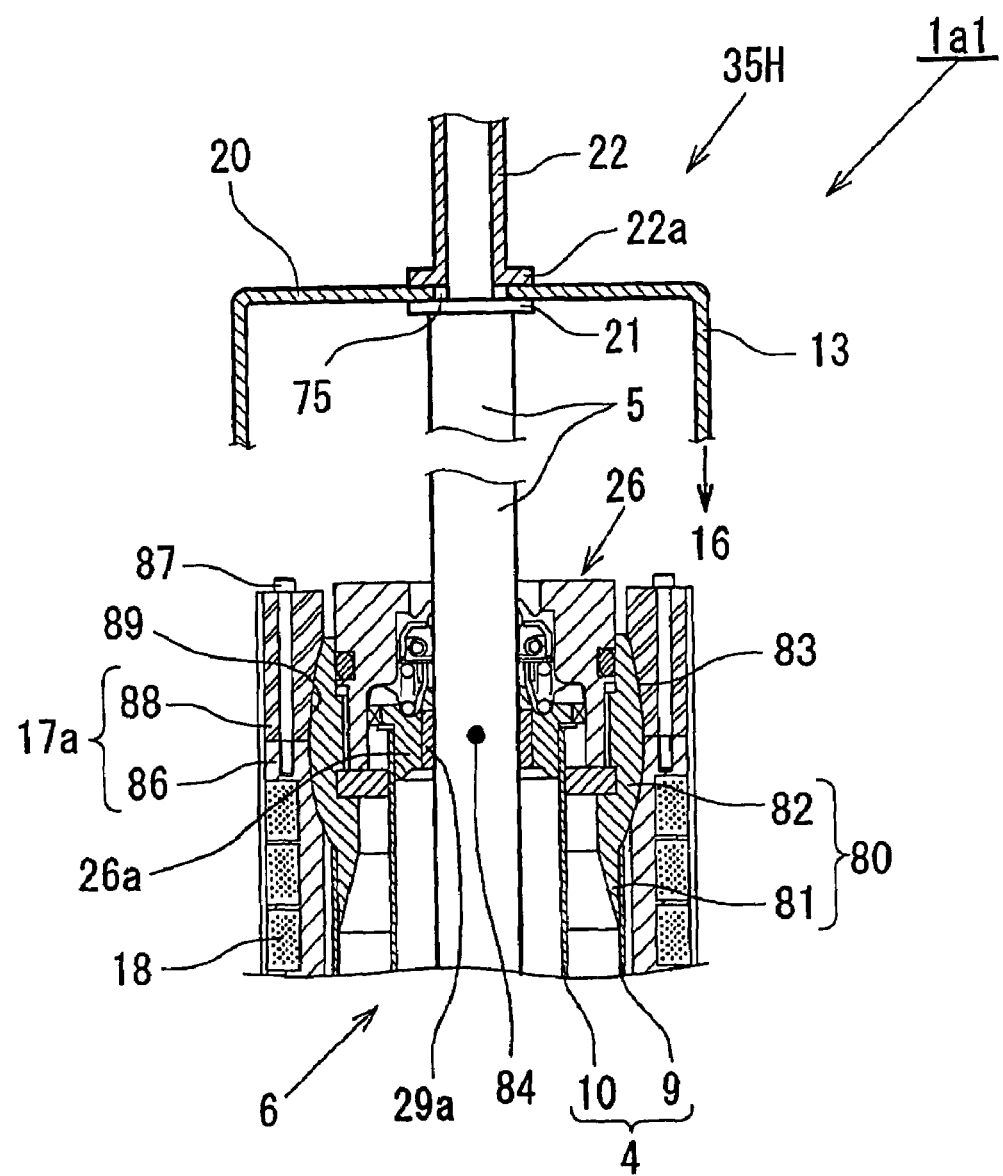
FIG. 9 is an enlarged sectional view of an essential part of an electromagnetic suspension system according to a fifth embodiment of the present invention.

Next, referring to FIG. 9, description is made with regard to an electromagnetic suspension system 1*a*1 according to a fifth embodiment of the present invention. The same members as shown in FIG. 1 are designated by the same reference numerals as used in FIG. 1, and explanation thereof is omitted.

The electromagnetic suspension system 1*a*1 comprises the cap 26 (corresponding to a rod guide) connected to the outer tube 9. A rod guide 26*a* integral with the cap 26 is provided inside the cap 26. A dry metal (hereinafter referred to as "the in-cap dry metal") 29*a* is provided inside the rod guide 26*a* so as to guide sliding movement of the piston rod 5.

A ring member 80 (corresponding to a spherical bearing) is connected to the cap 26 and the outer tube 9. The ring member 80 extends between a portion of the cap 26 on a side of the outer tube 9 and a portion of the outer tube 9 on a side of the cap 26. The ring member 80 generally comprises a cylindrical ring-member base portion 81 fitting against an inner wall surface of the outer tube 9 and a cylindrical ring-member body portion 82 covering an outer circumferential surface of the cap 26 and merging into the ring-member base portion 81. The ring-member body portion 82 includes an outer circumferential portion in an arcuate form (hereinafter referred to as "the arcuate outer circumferential portion") 83. An outer circumferential surface of the arcuate outer circumferential portion 83 is equidistant at any position from a dry metal center 84 (in other words, the outer circumferential surface of the arcuate outer circumferential portion 83 forms a spherical surface).

The dry metal center 84 is a point that corresponds to the center of the in-cap dry metal 29*a* as viewed in a heightwise direction thereof (a vertical direction in FIG. 9) and that is located on the center axis of the piston rod 5 (corresponding to a rod).

In the electromagnetic suspension system 1*a*1, use is made of a split-type center yoke 17*a* (corresponding to the second cylindrical member). The center yoke 17*a* comprises a cylindrical center-yoke main body 86 and a cylindrical center-yoke separate body 88. The permanent magnet 18 is provided on an outer circumferential surface of the cylindrical center-yoke main body 86, which cooperates with the coil 15 to generate an electromagnetic force. The cylindrical center-yoke separate body 88 is connected to an upper end portion (as viewed in FIG. 9) of the center-yoke main body 86 by means of bolts 87. Since the center yoke is of a split type, it is possible to provide the ring member 80 within the center yoke.

An inner surface of a connecting portion between the center-yoke main body 86 and the center-yoke separate body 88 includes a recessed surface 89 conforming to the arcuate outer circumferential portion 83 of the ring member 80. The arcuate outer circumferential portion 83 is slidably received by the recessed surface 89. Since the ring member 80 is connected to the cap 26 and the outer tube 9 as described above, rocking movement of the outer tube 9 (the cylinder 4) relative to the center yoke 17*a* or rocking movement of the center yoke 17*a* relative to the outer tube 9 (the cylinder 4) can be permitted through the ring member 80.

For example, with respect to the center yoke 17*a*, by forming a lower end portion of the center yoke 17*a* as a free end and allowing the ring member 80 to slide along the recessed surface 89, the center yoke 17*a* is enabled to rock about the dry metal center 84. Likewise, the cylinder 4 is capable of rocking about the dry metal center 84.

Therefore, it is possible to avoid that a lateral force acting on the hydraulic damper (the cylinder 4) causes excessive sliding friction between the outer yoke 16 (the coil) and the center yoke 17*a* (the permanent magnet 18). Consequently, axial movement (a stroke) of the outer yoke 16 (the coil) and the center yoke 17*a* (the permanent magnet 18) relative to each other can be smoothly effected.

The electromagnetic suspension system 1*a*1 further comprises a universal joint mechanism 35H comprising the collar 22 including a flange 22*a*, an opening 75 formed in the outer-yoke pipe cover portion 20 [having a larger diameter than the opening 19 of the electromagnetic suspension system 1A of the second embodiment (FIG. 6)] and the shoulder portion 21 of the piston rod 5. In the electromagnetic suspension system 1*a*1, by means of the universal joint mechanism 35H, radial movement of the piston rod 5 relative to the outer-yoke pipe 13. [the outer yoke 16 (corresponding to the first cylindrical member)] is permitted, while axial movement of the outer-yoke pipe 13 (the outer yoke 16) is restricted.

Therefore, a lateral force acting on the hydraulic damper 6 (the piston rod 5) is prevented from acting on the outer-yoke pipe 13 (the outer yoke 16), thus avoiding occurrence of excessive sliding friction between the outer yoke 16 (the coil) and the center yoke 17*a* (the permanent magnet 18). Thus, axial movement (a stroke) of the outer yoke 16 (the coil) and the center yoke 17*a* (the permanent magnet 18) relative to each other can be smoothly effected.

Figure 10:
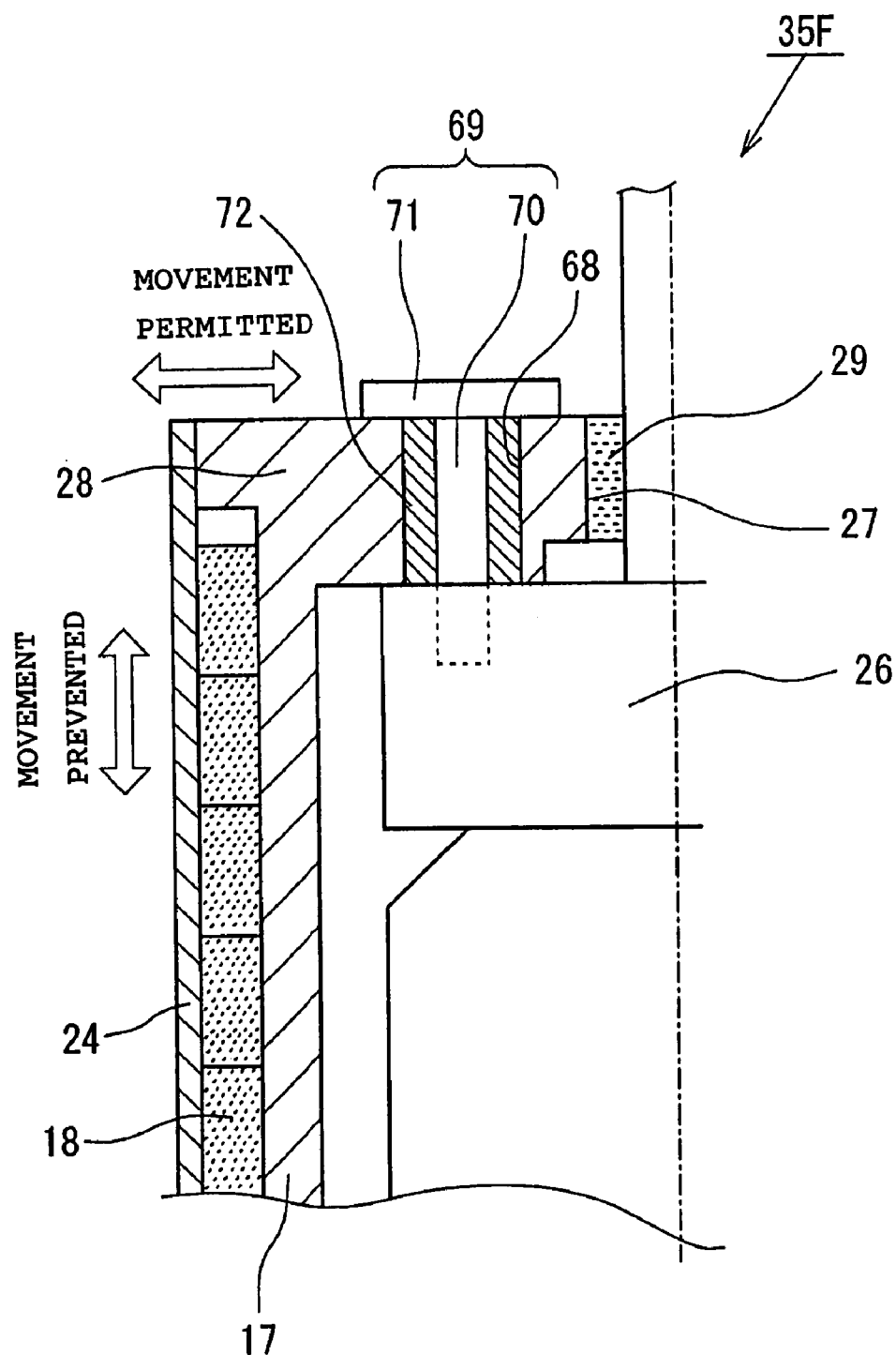
FIG. 10 is a sectional view of a universal joint mechanism, which is used instead of that shown in FIG. 8.

Instead of the universal joint mechanism 35E shown in FIG. 8, a universal joint mechanism 35F shown in FIG. 10 may be employed. The universal joint mechanism 35F is formed by inserting a rubber bush 72 into the opening 68 and inserting the pin body 70 of the cap-fixing pin 69 into a bore of the rubber bush 72. With this arrangement, noise generated by radial movement of the cylinder 4 (or the hydraulic damper 6) relative to the center yoke 17 can be effectively suppressed.

Figure 11:
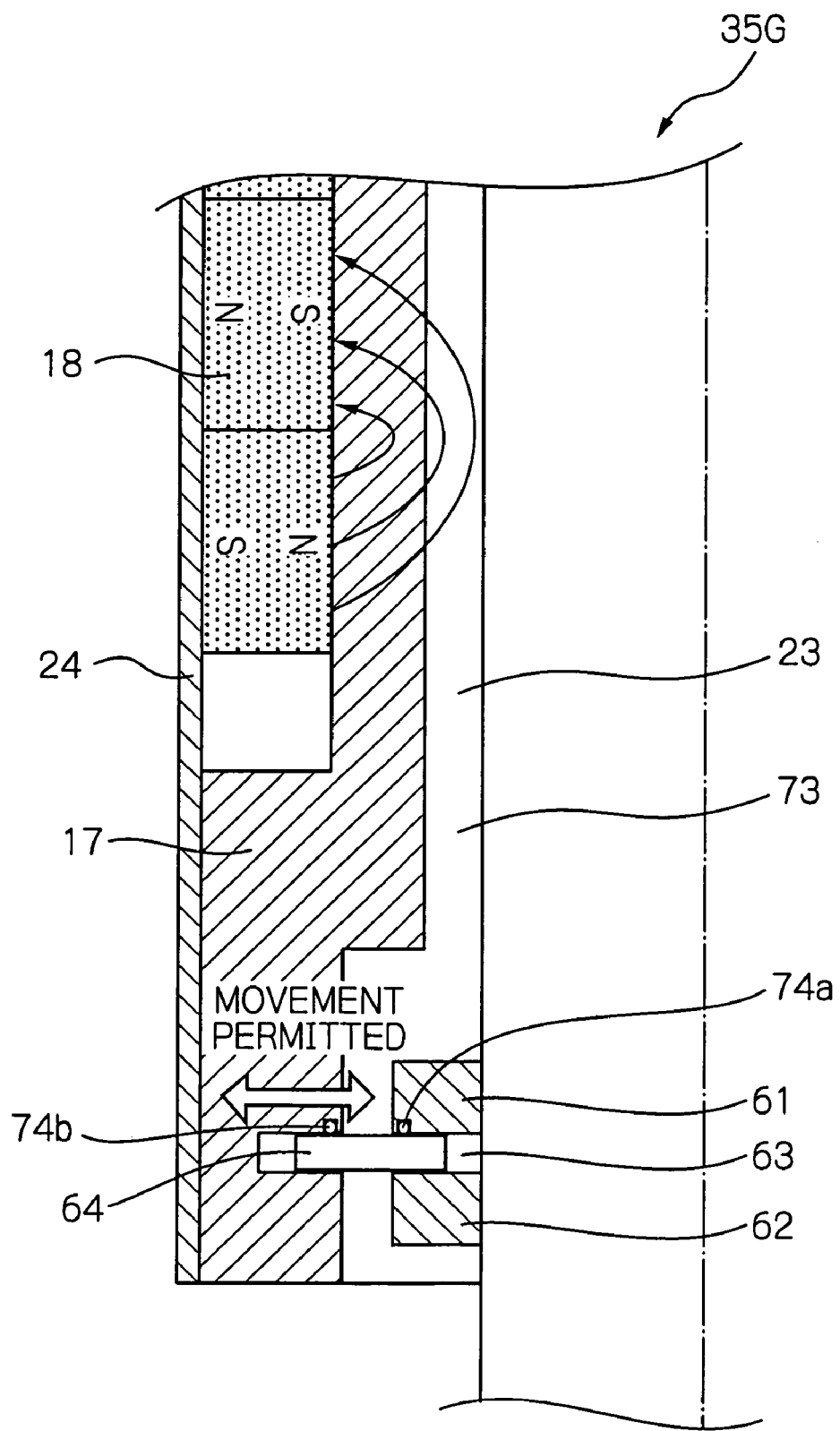
FIG. 11 is a sectional view of a universal joint mechanism, which is used instead of that shown in FIG. 10.

A universal joint mechanism 35G shown in FIG. 11 may also be used. The universal joint mechanism 35G differs from the universal joint mechanism 35C of FIG. 5 in that a magnetic fluid 73 is sealingly contained in the cylindrical space 23 (a lower part thereof) between the center yoke 17 and the outer tube 9 by means of an O-ring 74*a* provided between the annular first guide plate 61 and the retainer ring 64 (an annular retainer ring having no cut portion in this embodiment), and an O-ring 74b provided between the center yoke 17 and the retainer ring 64. The magnetic fluid 73 is capable of forming a part of a magnetic circuit and therefore has the same effect as obtained by increasing a wall-thickness of the center yoke 17. Therefore, it is possible to reduce the wall-thickness of the center yoke 17 to thereby achieve a reduction in the diameter and the weight of the electromagnetic linear motor 7.

Figure 12:
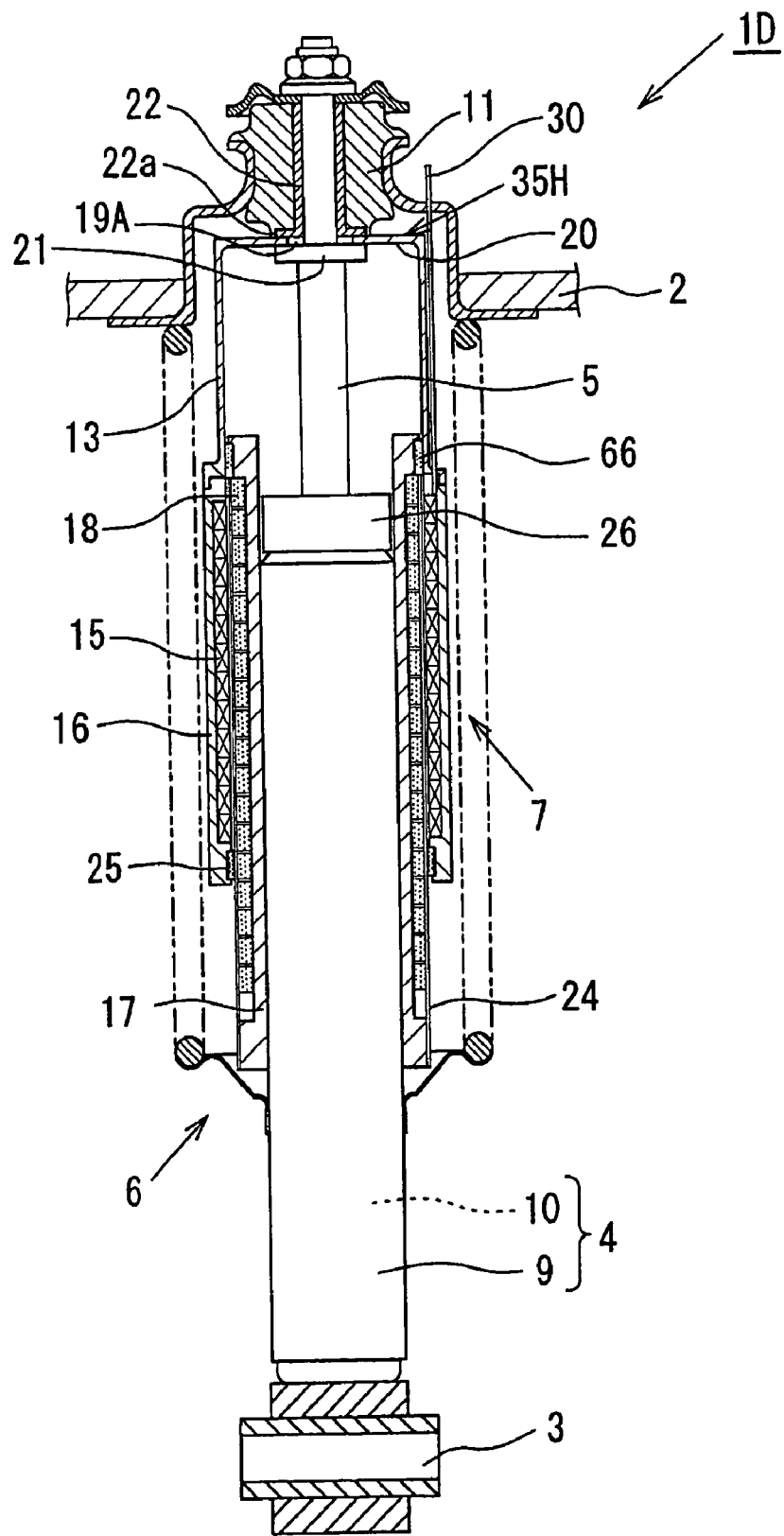
FIG. 12 is a sectional view of an electromagnetic suspension system according to a sixth embodiment of the present invention.
Figure 13:
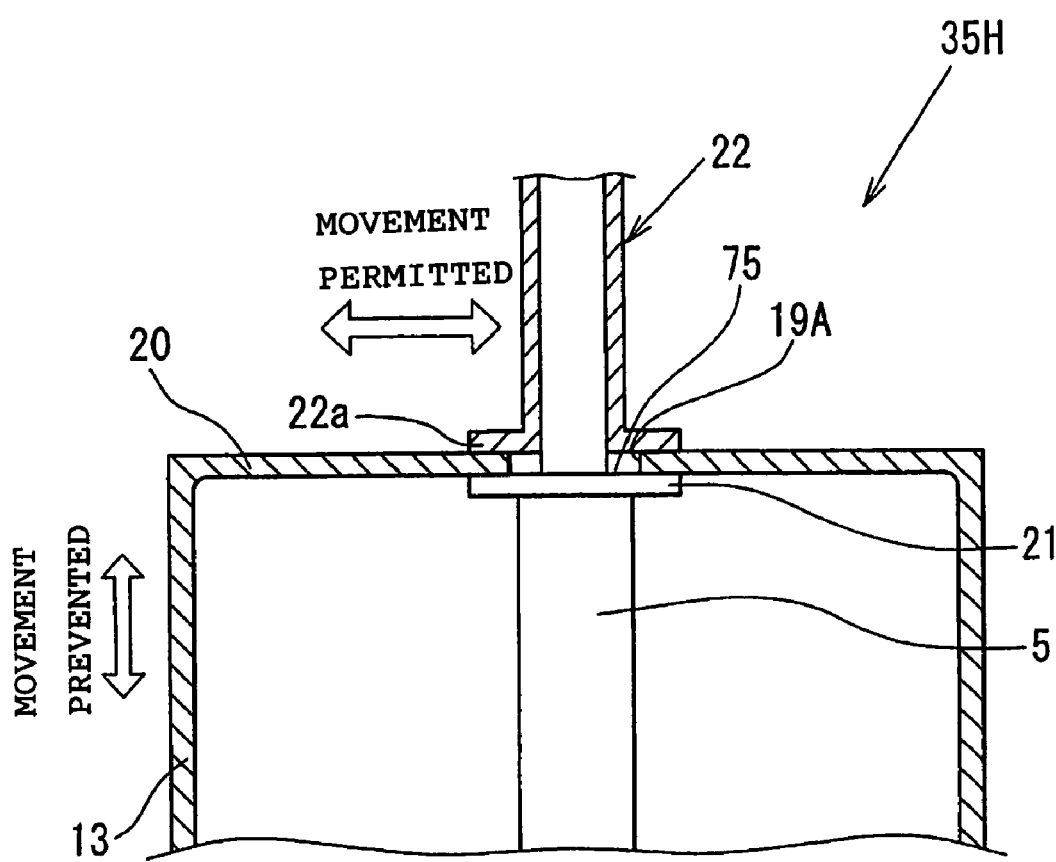
FIG. 13 is a sectional view of a universal joint mechanism shown in FIG. 12.

Next, referring to FIGS. 12 and 13, description is made with regard to an electromagnetic suspension system 1D according to a sixth embodiment of the present invention. The electromagnetic suspension system 1D mainly differs from the electromagnetic suspension system 1A of the second embodiment (FIG. 6) in that: the universal joint mechanism 35 provided between one end of the center yoke 17 and the outer circumferential surface of the outer tube 9 (the cylinder 4) is eliminated; a universal joint mechanism 35H is provided between the outer-yoke pipe cover portion 20, that is, the outer yoke 16 (the first cylindrical member), and the piston rod 5; and the hydraulic damper 6 and the electromagnetic linear motor 7 are integrally connected to each other by fitting the outer tube 9 into the center yoke 17. In this embodiment, the center yoke 17 forms the second cylindrical member.

In FIGS. 12 and 13, the outer-yoke pipe cover portion 20 has an opening 19A having a larger diameter than the opening 19 of the outer-yoke pipe cover portion 20 of the electromagnetic suspension system 1A of the second embodiment (FIG. 6), and a large space 75 is formed between the outer-yoke pipe cover portion 20 and the piston rod 5. This permits radial relative movement between the piston rod 5 and the outer-yoke pipe 13 (the outer yoke 16). The flange 22a formed at a lower end of the collar 22 is disposed between the outer-yoke pipe cover portion 20 and the vehicle-body rubber bush 11, so that the outer-yoke pipe cover portion 20 is held between the flange 22a and the shoulder portion 21 of the piston rod 5. The universal joint mechanism 35H comprises the collar 22 including the flange 22a, the opening 19A of the outer-yoke pipe cover portion 20 and the shoulder portion 21 of the piston rod 5.

In the electromagnetic suspension system 1D, by means of the universal joint mechanism 35H, the outer-yoke pipe cover portion 20, and hence the outer-yoke pipe 13, are fixed to the shoulder portion 21 of the piston rod 5 and the collar 22. On the other hand, the diameter of the opening 19A of the outer-yoke pipe cover portion 20 is larger than that of an upwardly extended shaft portion of the piston rod 5, and the large space 75 is formed between the outer-yoke pipe cover portion 20 and the piston rod 5. Therefore, the piston rod 5 is prevented from moving in an axial direction (a direction of a stroke) relative to the outer-yoke pipe 13, and hence the outer yoke 16. On the other hand, the piston rod 5 is capable of moving in a radial direction (a direction perpendicular to the direction of a stroke) relative to the outer-yoke pipe 13, and hence the outer yoke 16.

As has been described above, in the electromagnetic suspension system 1D, when a lateral force acts on the piston rod 5, radial movement of the piston rod 5 relative to the outer-yoke pipe 13, and hence the outer yoke 16, is permitted. Therefore, when a lateral force acts on the piston rod 5, the piston rod 5 radially moves relative to the outer-yoke pipe 13, and hence the outer yoke 16. As the piston rod 5 radially moves, the cylinder 4 and the center yoke 17 are translated together in a radial direction, without being displaced relative to the piston rod 5. Therefore, the guide pipe 24 uniformly slides, while covering the permanent magnet 18, on the center-yoke dry metal 25 provided on the inner circumferential surface of one end of the outer yoke 16. Further, the coil 15 provided on the inner circumferential surface of the outer yoke 16 uniformly slides on the pipe dry metal 66 attached to the other end of the center yoke 17. Consequently, excessive sliding friction does not occur in the center-yoke dry metal 25 and the pipe dry metal 66 as slide/support members, so that smooth axial relative displacement between the center yoke 17 as the second cylindrical member (or the permanent magnet 18) and the outer yoke 16 as the first cylindrical member (or the coil 15) can be ensured.

In the above embodiments, the electromagnetic suspension systems 1, 1A, 1B, 1C, 1a1 and 1D are applied to an automobile. However, this does not limit the present invention. The electromagnetic suspension systems can be used as a yaw damper provided between a car (corresponding to a vehicle body) and a truck (corresponding to an axle) of a railway vehicle. The electromagnetic suspension systems can also be used for other types of vehicles, structures, buildings, etc. This also applies to electromagnetic suspension systems 1a2, 1a3 and 1a4 described in the following embodiments. Further, in the above embodiments, the hydraulic damper 6 is used as the extensible member, to thereby add a damping force to that generated by an electromagnetic linear motor. However, this does not limit the present invention. It is possible to use, as the extensible member, a friction damper that generates a frictional force by sliding friction, or a hydraulic (or air) cylinder that extends and contracts by means of a hydraulic fluid (or air) to be supplied to or discharged from the cylinder.

Figure 14:
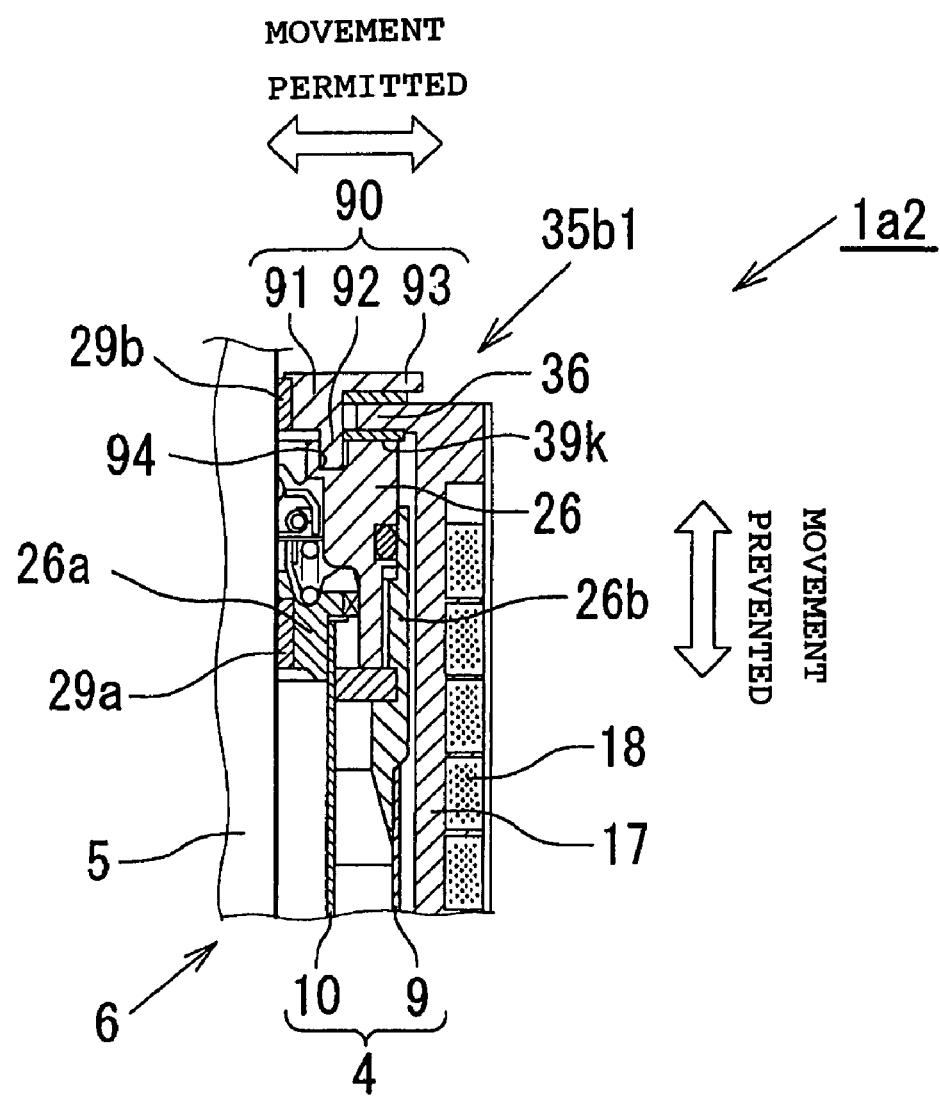
FIG. 14 is a sectional view of a universal joint mechanism used in an electromagnetic suspension system according to a seventh embodiment of the present invention.

Next, description is made with regard to an electromagnetic suspension system 1a2 according to a seventh embodiment of the present invention, referring to FIG. 14 in combination with FIGS. 1 and 2 (the first embodiment). In the electromagnetic suspension system 1 of FIGS. 1 and 2, the universal joint mechanism 35 is provided between a portion of the outer tube 9 on a side of the spring bearing 31 and the center yoke 17 (the second cylindrical member). In the electromagnetic suspension system 1a2, the universal joint mechanism 35 of FIGS. 1 and 2 is eliminated, and, as indicated in FIG. 14, a universal joint mechanism 35b1 having a structure substantially corresponding to that of the universal joint mechanism 35 is provided between a portion of the outer tube 9 on a side of a projected portion of the piston rod 5 (on a side of the cap 26) and the center yoke 17.

Further, the center-yoke dry metal 25 (see FIG. 1) is provided on the inner circumferential surface of one end (on a side of the unsprung mass; a lower side in FIG. 1) of the outer yoke 16 (the first cylindrical member), so as to guide axial sliding movement of the guide pipe 24 (the center yoke 17) without lubrication.

Referring to FIG. 14, the universal joint mechanism 35b1 generally comprises a plurality of (for example, four) pins 36, insulators 39K made of rubber or an elastic resin material and an annular fixing member 90.

The pins 36 are circumferentially arranged in a predetermined spaced relationship to each other on the inner circumferential surface of one end (on an upper side in FIG. 14) of the center yoke 17. The pins 36 extend from the inner circumferential surface of the center yoke 17 in a direction perpendicular to the inner circumferential surface of the center yoke 17 (that is, a radial direction).

Each insulator 39K includes a through-hole for insertion of a corresponding pin 36. The pins 36 are held between the cap 26 and the annular fixing member 90, with the insulators 39K being fitted over the pins 36. The cap 26 is attached to a cylindrical member 26b connected to the outer tube 9.

A dry metal (hereinafter referred to as "the fixing-member dry metal") 29b is interposed between the fixing member 90 and the piston rod 5.

The fixing member 90 comprises a fixing-member body portion 91 facing the fixing-member dry metal 29b, an axial extension 92 axially extending from the fixing-member body portion 91 and a radial extension 93 extending radially outwardly from the fixing-member body portion 91. The axial extension 92 is fitted into an annular groove 94 formed in an upper end face of the cap 26, and fixed relative to the cap 26.

The pin 36, with the insulator 39K being attached thereto, is disposed between the end face of the cap 26 and the radial extension 93, with a space being provided between a distal end of the pin 36 and the fixing-member body portion 91.

The universal joint mechanism 35b1 is provided between the cap 26, and hence the outer tube 9 (the cylinder 4), and the center yoke 17. It permits radial movement of the outer tube 9 relative to the center yoke 17 and prevents axial movement of the outer tube 9 relative to the center yoke 17.

In the seventh embodiment, the universal joint mechanism 35b1, which is provided between the outer tube 9 (the cylinder 4) and the center yoke 17, permits radial movement of the outer tube 9 relative to the center yoke 17. Therefore, if a lateral force acts on the hydraulic damper 6 (the outer tube 9), the lateral force does not have any significant effect on the center yoke 17, with respect to radial (rocking) movement thereof. Therefore, it is possible to avoid that excessive sliding friction occurs in the center-yoke dry metal 25 and the pipe dry metal 66 as slide/support members, so that smooth axial relative displacement between the center yoke 17 and the outer yoke 16 and between the piston rod 5 and the center yoke 17 can be ensured.

Since the insulators 39K are provided between the pins 36 and the fixing member 90, it is possible to prevent the fixing member 90 and the pins 36 from directly making contact with each other (metal contact) and prevent the cap 26 and the pins 36 from directly making contact with each other (metal contact). This suppresses generation of noise.

Instead of the pins 36 extended from the inner circumferential surface of one end of the center yoke 17, an annular plate member may be fixedly provided on the inner circumferential surface of one end of the center yoke 17.

Figure 15:
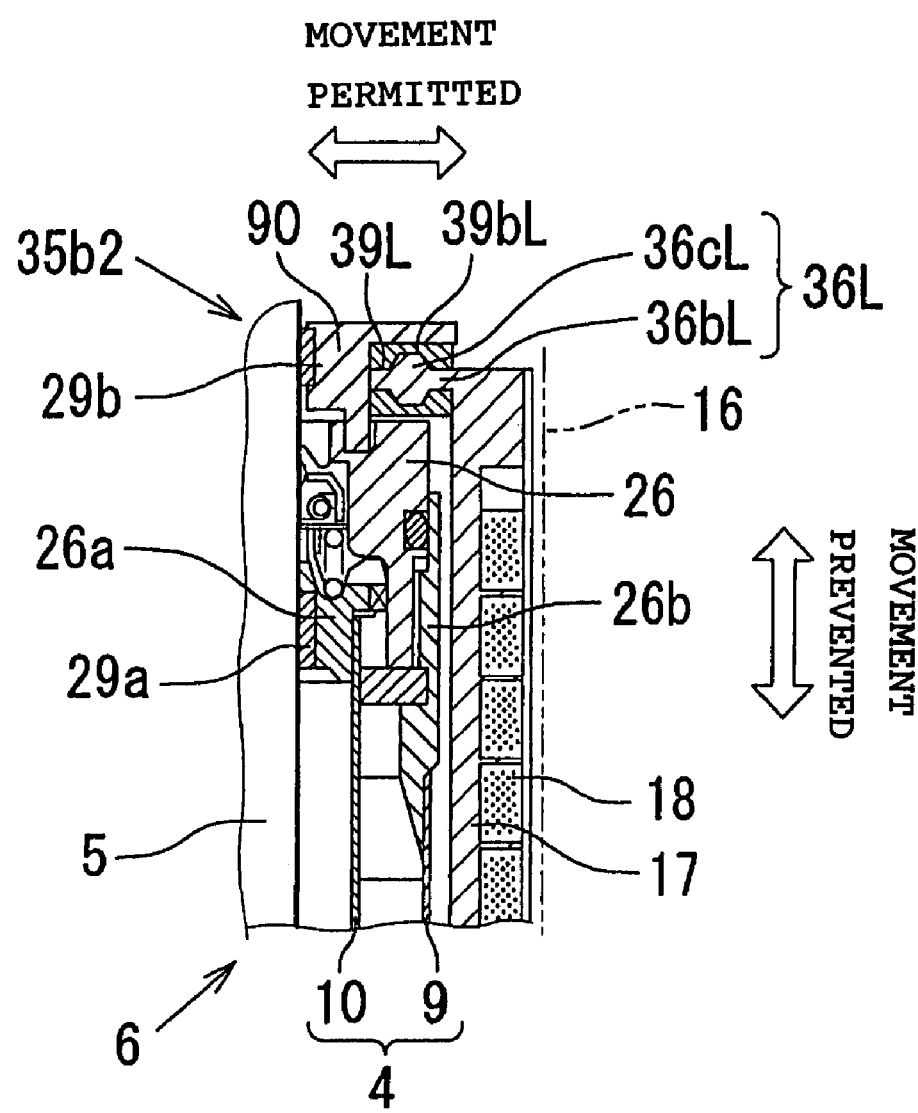
FIG. 15 is a sectional view of a universal joint mechanism, which is used instead of that shown in FIG. 14.

As indicated in FIG. 15, a universal joint mechanism 35b2 may be used, instead of the universal joint mechanism 35b1 of FIG. 14.

In FIG. 15, the universal joint mechanism 35b2 has a structure corresponding to the universal joint mechanism 35A in FIG. 3. That is, the universal joint mechanism 35b2 differs from the universal joint mechanism 35b1 in FIG. 14 in that: pins 36L corresponding to the pins shown in FIG. 3 are provided, instead of the pins 36 in FIG. 14; and insulators 39L having forms conforming to the pins 36L are used, instead of the insulators 39K.

Each pin 36L comprises a cylindrical pin body 36bL and a diametrically enlarged portion 36cL formed at a central portion of the pin body 36bL. Each insulator 39L has a generally rectangular pillarlike form, and includes a hollow portion. The hollow portion of the insulator 39L includes openings respectively formed on opposite ends thereof, each having a diameter substantially equal to the diameter of the pin body 36bL, and also includes a recessed cylindrical portion 39bL formed at a central portion thereof, which has a diameter substantially equal to that of the diametrically enlarged portion 36cL. The diametrically enlarged portion 36cL is fittingly disposed in the recessed cylindrical portion 39bL. An upper side and a lower side of the insulator 39L are, respectively, fixed to the fixing member 90 and the cap 26 by adhesion.

In the universal joint mechanism 35b2, the insulator 39L between the pin body 36bL and the fixing member 90 and between the pin body 36bL and the cap 26 has a large wall-thickness and is capable of radial deformation, thereby permitting radial movement of the hydraulic damper 6 relative to the center yoke 17. Therefore, smooth axial displacement of the center yoke 17 as the second cylindrical member (or the permanent magnet 18) relative to the outer yoke 16 as the first cylindrical member (or the coil 15) can be ensured. Further, since the diametrically enlarged portion 36cL is fittingly disposed in the recessed cylindrical portion 39bL, the insulator 39L between the diametrically enlarged portion 36cL and the fixing member 90 and between the diametrically enlarged portion 36cL and the cap 26 becomes thin-walled, and is not substantially deformed in an axial direction, thus preventing axial movement of the hydraulic damper 6 relative to the center yoke 17. Therefore, it is possible to suppress excessive sliding friction in the slide/support members (the center-yoke dry metal 25 and the piston-rod dry metal 29).

By means of the insulator 39L, it is possible to suppress noise generated by direct contact (metal contact) between the fixing member 90 and the pin 36L or direct contact (metal contact) between the cap 26 and the pin 36L.

Instead of the insulator 39K of FIG. 14 made of rubber or an elastic resin material and the insulator 39L of FIG. 15 made of rubber or an elastic resin material, a disc spring, a wavy spring or a coil spring, which undergoes only minute deformation and does not affect the controlling of a linear actuator, may be used. In this case, utilizing resilience of any one of these members, direct contact (metal contact) between the fixing member 90 and the pin 36 or 36L or direct contact (metal contact) between the cap 26 and the pin 36 or 36L can be prevented, thereby suppressing generation of noise. This also applies to an eighth embodiment (FIG. 16) described later.

Figure 16:
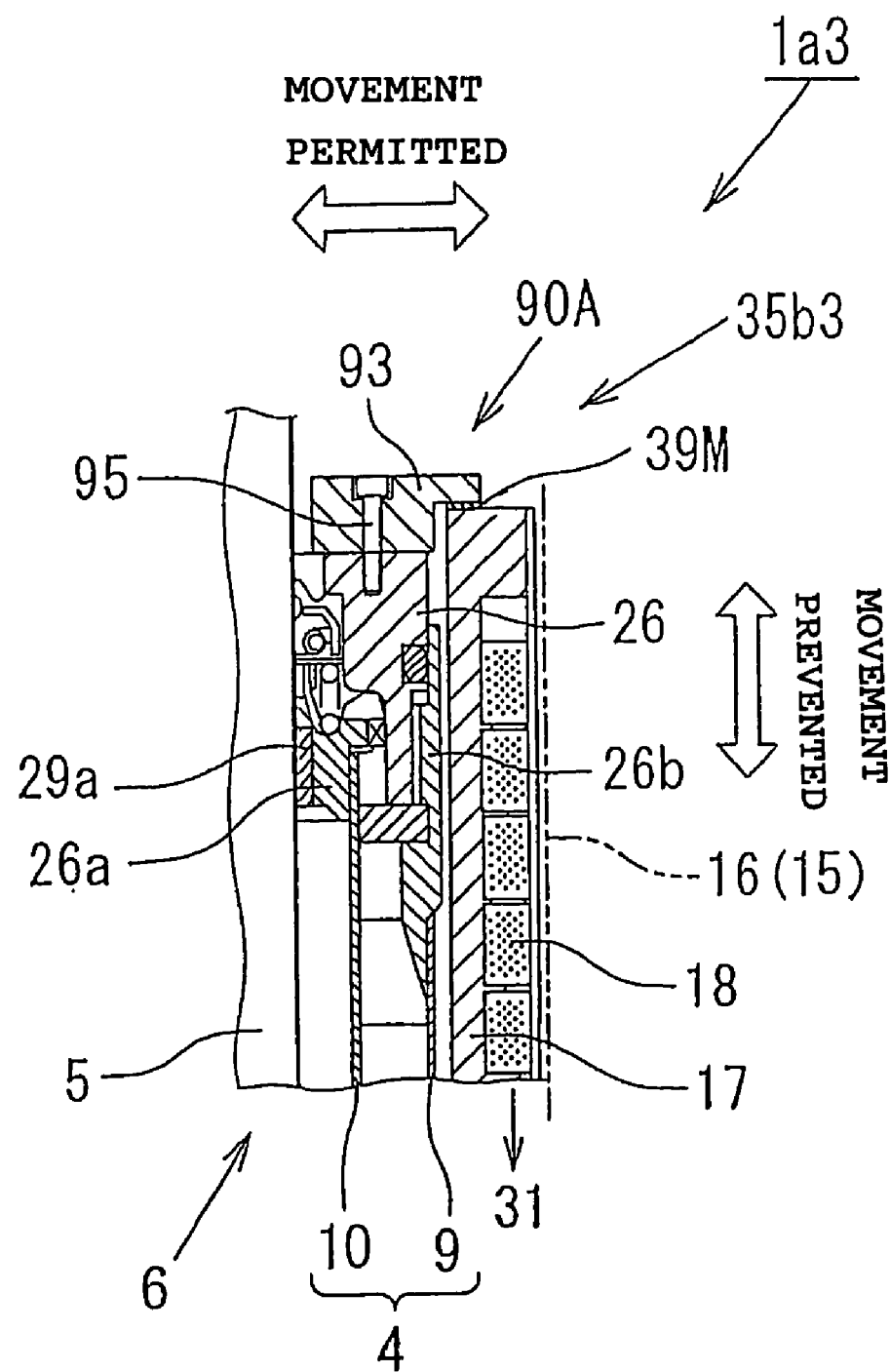
FIG. 16 is a sectional view of a universal joint mechanism used in an electromagnetic suspension system according to an eighth embodiment of the present invention.

Next, referring to FIG. 16 in conjunction with FIG. 1 (the first embodiment), description is made with regard to an electromagnetic suspension system 1a3 according to the eighth embodiment of the present invention.

In the electromagnetic suspension system 1a3 of FIG. 16, a universal joint mechanism 35b3 is provided, instead of the universal joint mechanism 35b1 of FIG. 14. The universal joint mechanism 35b3 mainly differs from the universal joint mechanism 35b1 of FIG. 14 in that: the center yoke 17 has no pins 36; a fixing member 90A having no axial extension 92 is used, instead of the fixing member 90 having the axial extension 92; the fixing member 90A is fixed to the cap 26 by means of bolts 95; an insulator 39M made of rubber or an elastic resin material is provided between the radial extension 93 of the fixing member 90A and the center yoke 17, the center yoke 17 (the second cylindrical member) being extended so that its upper end abuts against the insulator 39M and its lower end abuts against the spring bearing 31 shown in FIG. 1, thus positioning the center yoke 17.

Thus, the center yoke 17 is positioned between the insulator 39M and the spring bearing 31. Therefore, axial movement of the center yoke 17 is restricted, while radial movement of the center yoke 17 relative to the cap 26, and hence the cylinder 4, is permitted. In other words, the cap 26, and hence the cylinder 4, are capable of radial movement relative to the center yoke 17. Therefore, smooth axial relative displacement between the center yoke 17 (or the permanent magnet 18) and the outer yoke 16 as the first cylindrical member (or the coil 15) can be ensured.

Figure 17:
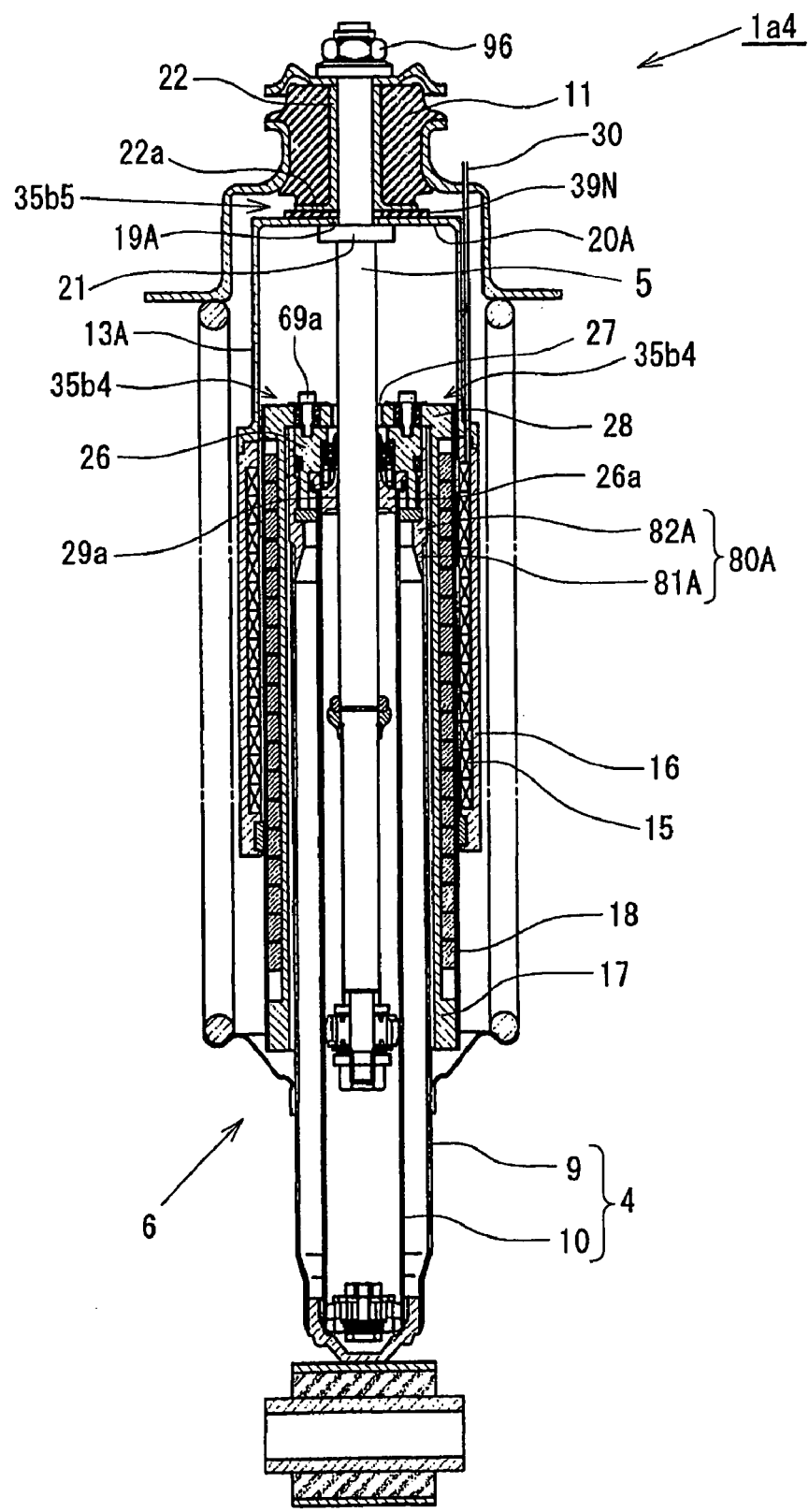
FIG. 17 is a sectional view of an electromagnetic suspension system according to a ninth embodiment of the present invention.
Figure 18:
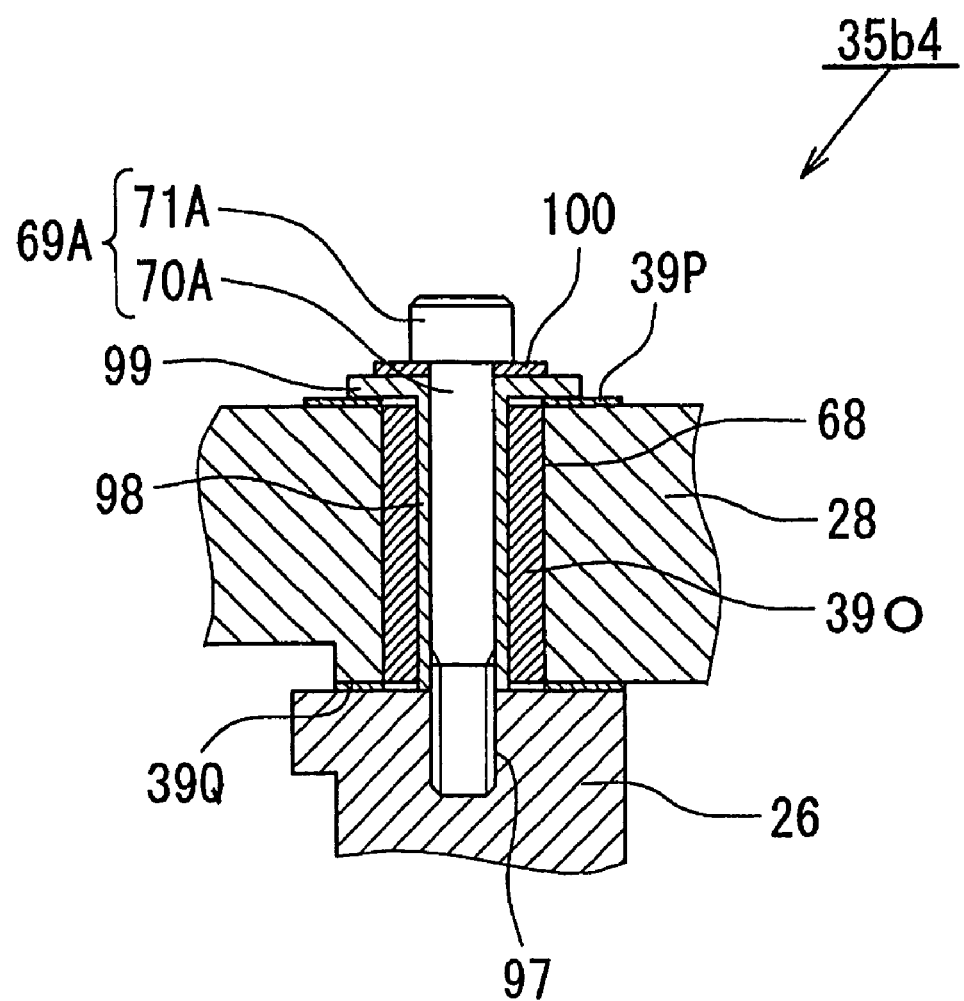
FIG. 18 is a sectional view of a universal joint mechanism shown in FIG. 17.

Next, referring to FIGS. 17 and 18, description is made with regard to an electromagnetic suspension system 1a4 according to a ninth embodiment of the present invention. The electromagnetic suspension system 1a4 comprises a universal joint mechanism 35b4 provided between the center-yoke cover portion 28 of the center yoke 17 (the second cylindrical member) and the cap 26 (the cylinder 4) and a universal joint mechanism 35b5 provided between the piston rod 5 and an outer-yoke pipe 13A [the outer yoke 16 (the first cylindrical member)].

In FIGS. 17 and 18, the electromagnetic suspension system 1a4 has the cap 26 which is integral with the outer tube 9 through a ring member 80A connected to the outer tube 9. A dry metal (hereinafter referred to as "an in-cap dry metal") 29a is provided on the rod guide 26a connected to an inner side of the cap 26. The in-cap dry metal 29a is adapted to guide sliding movement of the piston rod 5 relative to the cylinder 4.

The ring member 80A extends between the portion of the cap 26 on a side of the outer tube 9 and the portion of the outer tube 9 on a side of the cap 26. The ring member 80A mainly comprises a cylindrical ring-member base portion 81A fitting against the inner wall surface of the outer tube 9 and a cylindrical ring-member body portion 82A covering the outer circumferential surface of the cap 26 and merging into the ring-member base portion 81A. Differing from the ring-member body portion 82 in FIG. 9, the ring-member body portion 82A includes no arcuate outer circumferential portion 83.

The electromagnetic suspension system 1a4 has the outer-yoke pipe 13A. The outer-yoke pipe 13A is connected to the cylindrical outer yoke 16. The coil 15 is provided on the inner circumferential surface of the cylindrical outer yoke 16. The outer-yoke pipe 13A includes a cover portion (hereinafter referred to as "the outer-yoke pipe cover portion") 20A formed at an upper end portion thereof. The outer-yoke pipe cover portion 20A includes the opening 19A for allowing passage of the piston rod 5. The diameter of the opening 19A is larger than the diameter of the piston rod 5. The opening 19A cooperates with an insulator 39N described later, to thereby permit radial movement of the outer-yoke pipe 13A, and hence the outer yoke 16, relative to the piston rod 5.

The electromagnetic suspension system 1a4 comprises the collar 22 including the flange 22a, and the insulator 39N in an annular form interposed between the flange 22a and the outer-yoke pipe cover portion 20A. The outer-yoke pipe cover portion 20A, together with the insulator 39N, is held between the collar 22 and the shoulder portion 21, and fastened by means of a nut 96, to thereby restrict axial movement of the outer-yoke pipe cover portion 20A. In this embodiment, the universal joint mechanism 35b5 is formed by the nut 96, the outer-yoke pipe cover portion 20A including the opening 19A, the collar 22 and the insulator 39N. The universal joint mechanism 35b5 permits radial movement of the piston rod 5 relative to the outer yoke 16 and prevents axial movement of the piston rod 5 relative to the outer yoke 16.

The universal joint mechanism 35b4 comprises a plurality of openings 68 formed in the center-yoke cover portion 28, which are arranged in a circumferential direction about the opening 27, and bolts (cap-fixing bolts) 69A which are inserted into the openings 68 and threadably engaged with threaded openings 97 formed in the cap 26.

The cap-fixing bolt 69A comprises a bolt body 70A inserted into the opening 68 and fixed to the cap 26 and a bolt head 71A fixed to the bolt body 70A. A cylindrical insulator 39O made of rubber or an elastic resin material is disposed in the opening 68. A cylindrical bolt guide 98 having a predetermined length is inserted into the insulator 39O.

The cap-fixing bolt 69A is threadably engaged with the threaded opening 97 through the bolt guide 98. A washer 100 is provided between the bolt head 71A and a flange 99 of the bolt guide 98. An annular insulator (hereinafter referred to as "the upper insulator") 39P made of rubber or an elastic resin material is provided between the flange 99 of the bolt guide 98 and the center-yoke cover portion 28. An annular insulator (hereinafter referred to as "the lower insulator") 39Q made of rubber or an elastic resin material is provided between the center-yoke cover portion 28 and the cap 26.

In the cap-fixing bolt 69A, the bolt head 71A is pressed against the outer surface of the center-yoke cover portion 28 through the washer 100, the flange 99 of the bolt guide 98 and the upper insulator 39P, to thereby prevent axial movement of the cap 26 (the cylinder 4) relative to the center yoke 17. As indicated in FIG. 18, a lower end of the cap-fixing bolt 69A is threadably engaged with the cap 26 through the bolt guide 98 abutting against the cap 26, which bolt guide has a predetermined length greater than that corresponding to the wall-thickness of the center-yoke cover portion 28. Therefore, even when an excessive fastening torque is applied to the cap-fixing bolt 69A, an amount of force over a predetermined level is received by the bolt guide 98, so that the center yoke 17 can be fastened to the cap 26 (the cylinder 4) under predetermined force. That is, if the fastening torque for the cap-fixing bolt 69A varies, the bolt guide 98 makes it possible to avoid the center yoke 17 being fastened to the cap 26 (the cylinder 4) under a force exceeding the predetermined level.

The cap-fixing bolt 69A is inserted into the opening 68 of the center-yoke cover portion 28 through the insulator 39O. Since the insulator 39O is interposed between the center-yoke cover portion 28 and the cap-fixing bolt 69A, the cap-fixing bolt 69A is capable of moving in a radial direction relative to the cap 26, and hence the cylinder 4.

The electromagnetic suspension system 1a4 comprises the universal joint mechanism 35b4, in which the cap-fixing bolts 69A are inserted, through the insulators 39O, into the openings 68 of the center-yoke cover portion 28. By means of the universal joint mechanism 35b4, radial movement of the cylinder 4 (the cap-fixing bolt 69A) relative to the center yoke 17 is permitted. Further, since the center-yoke cover portion 28 and the cap 26 are fastened to each other by means of the cap-fixing bolts 69A, axial relative movement between the center yoke 17 (the center-yoke cover portion 28) and the cylinder 4 (the cap 26) is prevented. In this case, because the upper insulator 39P is interposed between the flange 99 of the bolt guide 98 and the center-yoke cover portion 28, direct contact (metal contact) between the flange 99 of the bolt guide 98 and the center-yoke cover portion 28 can be avoided, to thereby suppress generation of noise. Further, because the lower insulator 39Q is interposed between the center-yoke cover portion 28 and the cap 26, direct contact (metal contact) between the center-yoke cover portion 28 and the cap 26 can be avoided, to thereby suppress generation of noise.

Further, the piston rod 5 is inserted into the opening 19A of the outer-yoke pipe cover portion 20A having a larger diameter than the piston rod 5, and the annular insulator 39N is provided between the flange 22a and the outer-yoke pipe cover portion 20. Therefore, radial movement of the piston rod 5 relative to the outer yoke 16 (the outer-yoke pipe 13A) is permitted.

Further, the outer-yoke pipe cover portion 20, together with the insulator 39N, is held between the collar 22 and the shoulder portion 21 (the piston rod 5) and fastened by the nut 96, so that axial movement of the outer-yoke pipe cover portion 20 is restricted. Consequently, the outer yoke 16, which is connected to the outer-yoke pipe 13 (the outer-yoke pipe cover portion 20), is prevented from moving in an axial direction relative to the piston rod 5.

In the above embodiments, the coil 15 is provided in the outer yoke 16 and the permanent magnet 18 is provided in the center yoke 17. However, this does not limit the present invention. The coil 15 and the permanent magnet 18 may be provided in the center yoke 17 and the outer yoke 16, respectively. That is, either one of the coil member and the magnetic member can be provided in the outer yoke, and the other can be provided in the center yoke.

In the above embodiments, the center yoke 17 connected to the cylinder is provided inside the outer yoke 16 connected to the piston rod. However, this does not limit the present invention. The outer yoke 16 connected to the piston rod may be provided inside the center yoke 17 connected to the cylinder. That is, one of the cylindrical members can be provided so as to face either one of an inner side or an outer side of the other cylindrical member.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Applications No. 2003-54358 filed on Feb. 28, 2003 and No. 2004-24670 filed on Jan. 30, 2004 including specifications, claims, drawings and summaries is incorporated herein by reference in its entirety.

What is claimed is:

1. An electromagnetic suspension system comprising:
an extensible member including a cylinder and a rod capable of displacement relative to the cylinder in the axial direction of the cylinder;
a first cylindrical member connected to the rod so as to be prevented from moving relative to the axial direction of the rod, either one of a coil member and a magnetic member being provided in the first cylindrical member; and
a second cylindrical member connected to the cylinder so as to be prevented from moving relative to the axial direction of the cylinder, the other of the coil member and the magnetic member being provided in the second cylindrical member, the second cylindrical member facing either one of an inner side and an outer side of the first cylindrical member, and the second cylindrical member being slidable relative to one of the inner side and the outer side of the first cylindrical member and guided thereby;
wherein the first cylindrical member and the second cylindrical member are arranged to obtain at least one of:
the first cylindrical member being capable of radial movement or rocking movement relative to the rod; and
the second cylindrical member being capable of radial movement or rocking movement relative to the cylinder.

2. An electromagnetic suspension system according to claim 1,
wherein the second cylindrical member is provided in such a manner as to permit radial movement thereof relative to the cylinder while preventing axial movement thereof relative to the cylinder.

3. An electromagnetic suspension system according to claim 1, wherein a bearing member for guiding sliding movement of the first cylindrical member and the second cylindrical member is provided between the first cylindrical member and the second cylindrical member.

4. An electromagnetic suspension system according to claim 3, wherein a universal joint mechanism for permitting the radial movement while preventing the axial movement is provided between the cylinder and the second cylindrical member.

5. An electromagnetic suspension system according to claim 1, wherein a universal joint mechanism for permitting the radial movement while preventing the axial movement is provided between the cylinder and the second cylindrical member.

6. An electromagnetic suspension system according to claim 1,
wherein the second cylindrical member is provided in such a manner as to permit radial movement thereof relative to the cylinder while preventing axial movement thereof relative to the cylinder
and wherein the first cylindrical member is provided in such a manner as to permit radial movement thereof relative to the rod while preventing axial movement thereof relative to the rod.

7. An electromagnetic suspension system according to claim 6, wherein universal joint mechanisms for permitting the radial movement while preventing the axial movement are respectively provided between the cylinder and the second cylindrical member and between the rod and the first cylindrical member.

8. An electromagnetic suspension system according to claim 6, wherein a bearing member for guiding sliding movement of the first cylindrical member and the second cylindrical member is provided between the first cylindrical member and the second cylindrical member.

9. An electromagnetic suspension system according to claim 8, wherein universal joint mechanisms for permitting the radial movement while preventing the axial movement are respectively provided between the cylinder and the second cylindrical member and between the rod and the first cylindrical member.

10. An electromagnetic suspension system according to claim 1, further comprising:
a rod guide provided in the cylinder and adapted to guide displacement of the rod;
a spherical bearing provided on an outer circumferential surface of the rod guide;
wherein the second cylindrical member is guided by the spherical bearing so that it is capable of performing rocking movement, thereby substantially uniformly maintaining a radial gap between the first cylindrical member and the second cylindrical member.

11. An electromagnetic suspension system according to claim 10, wherein a bearing member for guiding sliding movement of the first cylindrical member and the second cylindrical member is provided between the first cylindrical member and the second cylindrical member.

12. An electromagnetic suspension system according to claim 11, wherein a universal joint mechanism for permitting the radial movement while preventing the axial movement is provided between the rod and the first cylindrical member.

13. An electromagnetic suspension system according to claim 10, wherein a universal joint mechanism for permitting the radial movement while preventing the axial movement is provided between the rod and the first cylindrical member.

14. An electromagnetic suspension system according to claim 1, wherein a universal joint mechanism for permitting the radial movement while preventing the axial movement is provided between the rod and the first cylindrical member.

15. An electromagnetic suspension system according to claim 1, wherein a bearing member for guiding sliding movement of the first cylindrical member and the second cylindrical member is provided between the first cylindrical member and the second cylindrical member.

16. An electromagnetic suspension system according to claim 15, wherein a universal joint mechanism for permitting the radial movement while preventing the axial movement is provided between the rod and the first cylindrical member.

17. An electromagnetic suspension system according to claim 1, wherein the second cylindrical member is provided in such a manner as to be capable of performing rocking movement relative to the cylinder.

18. An electromagnetic suspension device according to claim 1, further comprising a universal joint mechanism including:
- a collar provided on the rod, the collar having a flange at one end thereof;
- an end of the first cylindrical member, the end including an opening through which the rod extends; and
- a shoulder portion formed on the rod, wherein the end of the first cylindrical member is held between the flange and the shoulder portion, thereby permitting radial movement of the first cylindrical member relative to the rod while restricting axial movement thereof.

19. An electromagnetic suspension system comprising:

an extensible member including a cylinder and a rod capable of displacement relative to the cylinder in the axial direction of the cylinder;

a first cylindrical member connected to the rod so as to be prevented from moving relative to the rod in the axial direction of the rod, either one of a coil member and a magnetic member being provided in the first cylindrical member; and a second cylindrical member connected to the cylinder so as to be prevented from moving relative to the cylinder in the axial direction of the cylinder, the other of the coil member and the magnetic member being provided in the second cylindrical member, the second cylindrical member facing either one of an inner side and an outer side of the first cylindrical member, the second cylindrical member being slidable relative to one of the inner side and the outer side of the first cylinder member and being guided thereby; and means for permitting at least one of:
(a) radial or rocking movement of the first cylindrical member relative to the rod, and
(b) radial or rocking movement of the second cylindrical member relative to the cylinder;

wherein said means comprises a connection that allows substantial radial or rocking movement but substantially no axial movement of at least one of the first cylindrical member relative to the rod and the second cylindrical member relative to the cylinder.

* * * * *